United States Patent [19]
White et al.

[11] 3,938,968
[45] Feb. 17, 1976

[54] PROCESS FOR THE PRODUCTION OF SUBSTITUTE NATURAL GAS

[75] Inventors: Gerald A. White, Los Angeles; Theodore R. Roszkowski, Malibu, both of Calif.

[73] Assignee: The Ralph M. Parsons Company, Pasadena, Calif.

[22] Filed: Sept. 6, 1974

[21] Appl. No.: 503,684

Related U.S. Application Data

[63] Continuation-in-part of Ser. No. 287,226, Sept. 8, 1972, abandoned.

[52] U.S. Cl. ................... 48/215; 48/197 R; 48/202; 252/459
[51] Int. Cl.² ................................................ C01B 2/14
[58] Field of Search .......... 48/215, 214, 197 R, 202, 48/205, 206; 260/449 M; 252/459

[56] References Cited
UNITED STATES PATENTS

| | | | |
|---|---|---|---|
| 2,830,883 | 4/1958 | Eastman | 48/197 R |
| 3,025,149 | 3/1962 | Eastman | 48/197 R |
| 3,031,287 | 4/1962 | Benson et al. | 48/197 R |
| 3,194,644 | 7/1965 | Gorin et al. | 48/197 R |
| 3,511,624 | 5/1970 | Humphries et al. | 48/197 R |
| 3,728,093 | 4/1973 | Cofield | 48/197 R |

FOREIGN PATENTS OR APPLICATIONS

| | | | |
|---|---|---|---|
| 644,004 | 10/1950 | United Kingdom | 48/205 |
| 273,781 | 6/1927 | United Kingdom | 48/205 |

OTHER PUBLICATIONS

Gas Engineers Handbook, The Industrial Press, 1965 pp. 3/111–3/117.

*Primary Examiner*—R. E. Serwin
*Attorney, Agent, or Firm*—Christie, Parker & Hale

[57] ABSTRACT

There is provided a process for the production of substitute natural gas (SNG) from carbonaceous materials such as hydrocarbon liquids including hydrocarbon fractions and/or solid carbonaceous fuels, by non-catalytic partial oxidation of the carbonaceous materials in the presence of process generated oxygen and high pressure steam, to form a gas stream containing principally hydrogen and oxides of carbon which are suitable for catalytic conversion to methane under conditions where sufficient waste heat is recovered in the form of high pressure steam to satisfy the steam requirements for the process and that necessary to drive compressors to produce oxygen from air as required by the partial oxidation stage. A product gas stream containing up to 99.9% methane and less than 1 ppm sulfur compounds may be obtained.

There may be included as part of the process a carburetion stage following the partial oxidation stage where intermediate hydrocarbon fractions are converted in part to methane and in part to hydrogen and the oxides of carbon.

13 Claims, 24 Drawing Figures

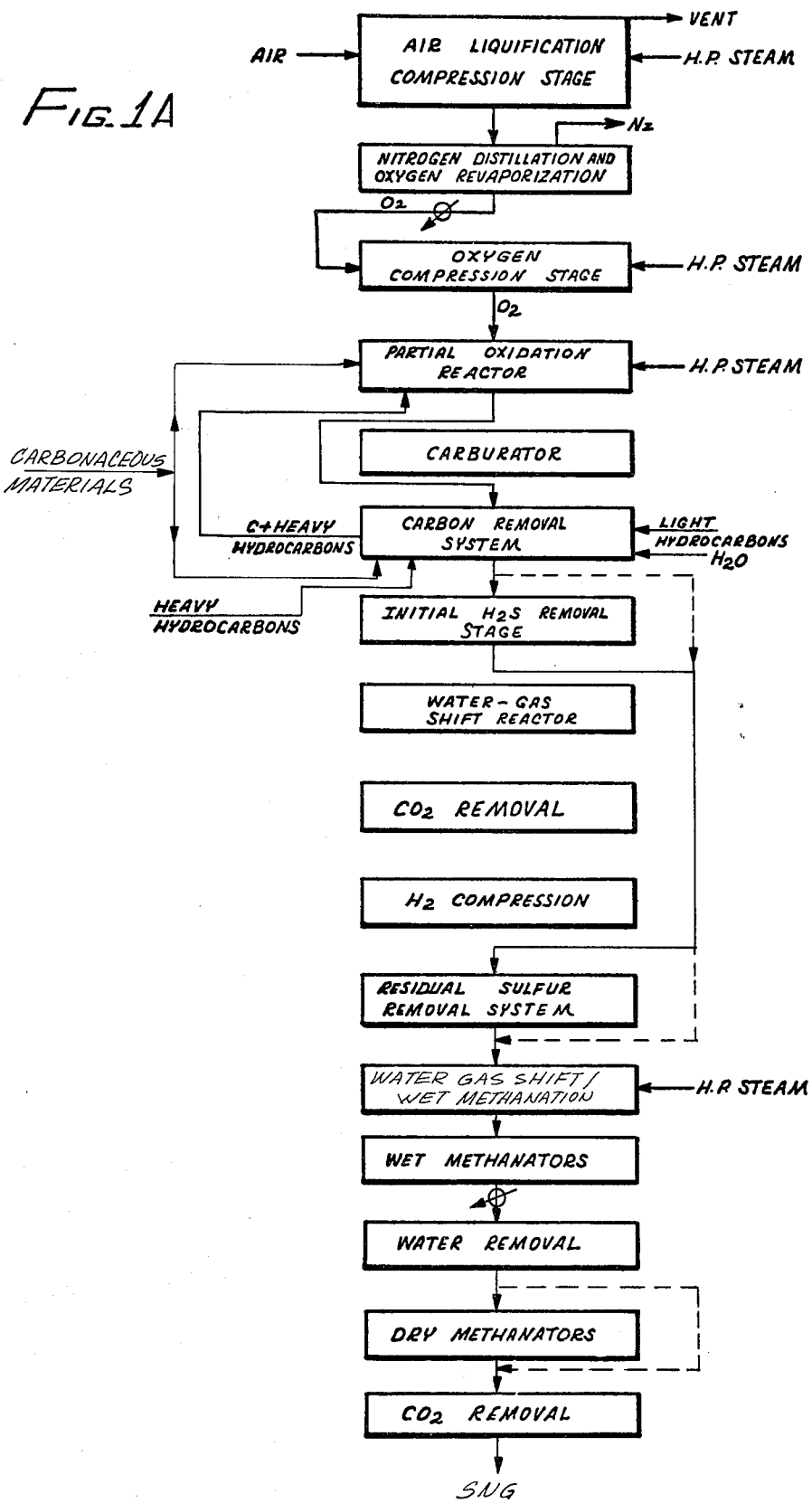

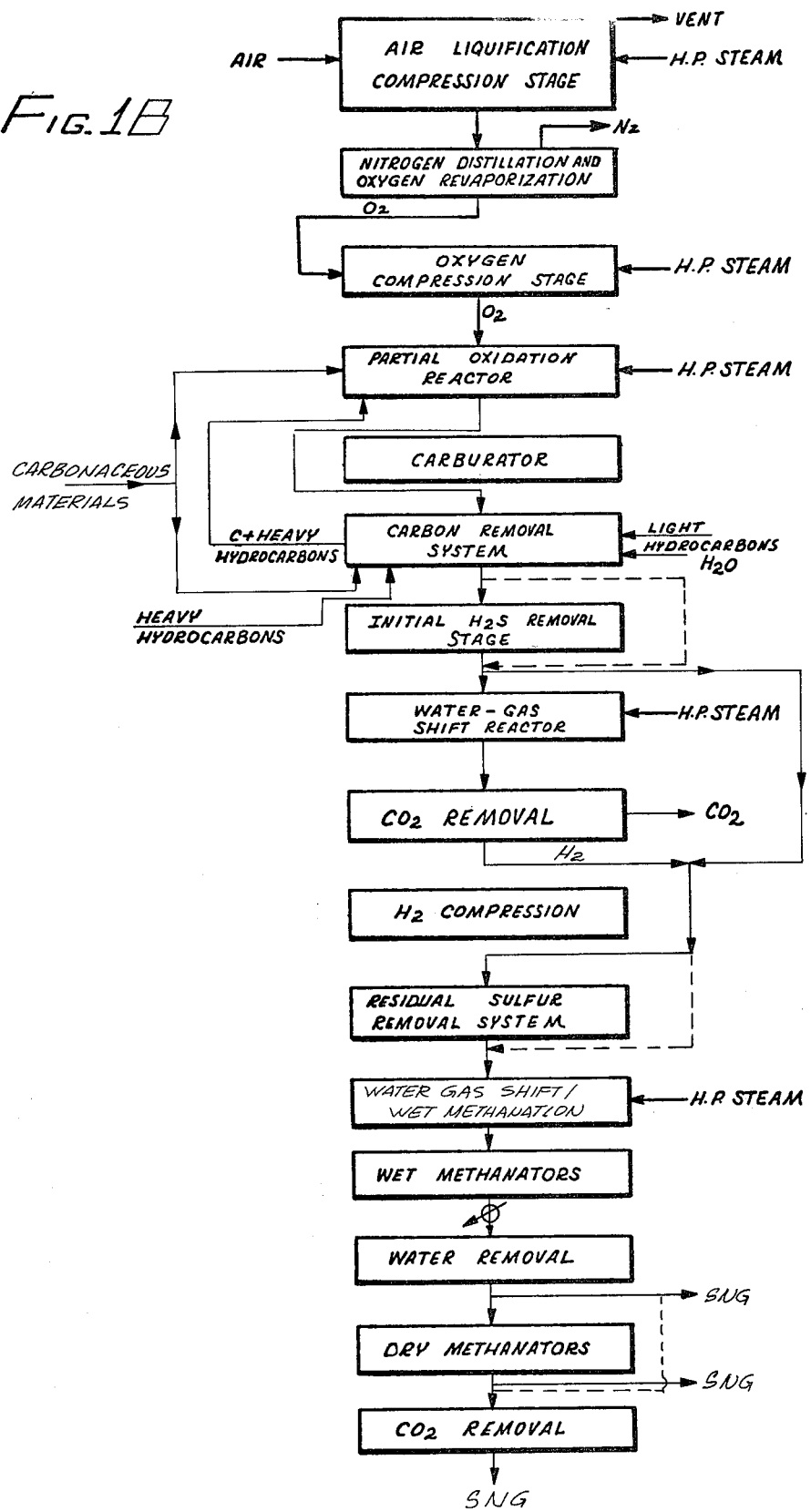

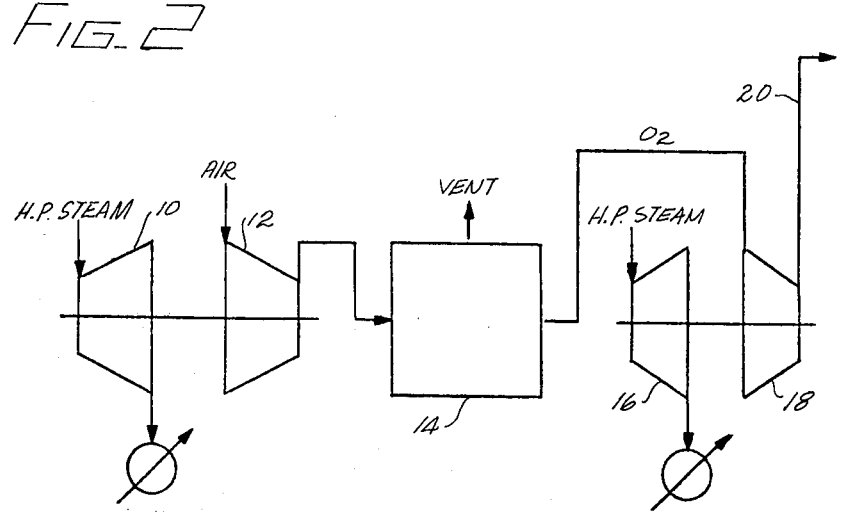
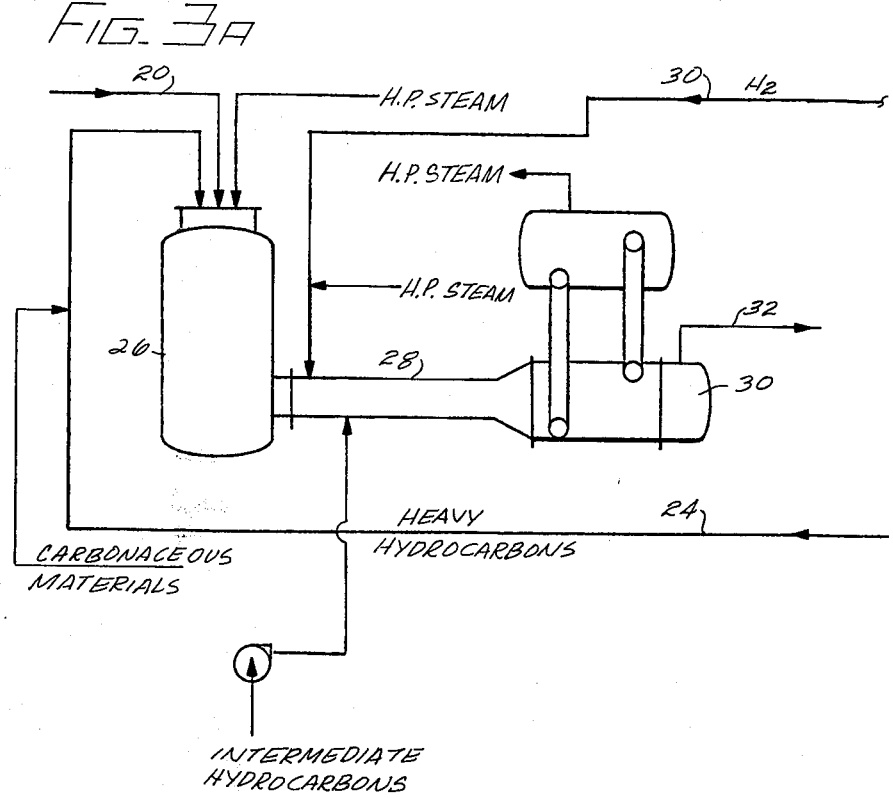

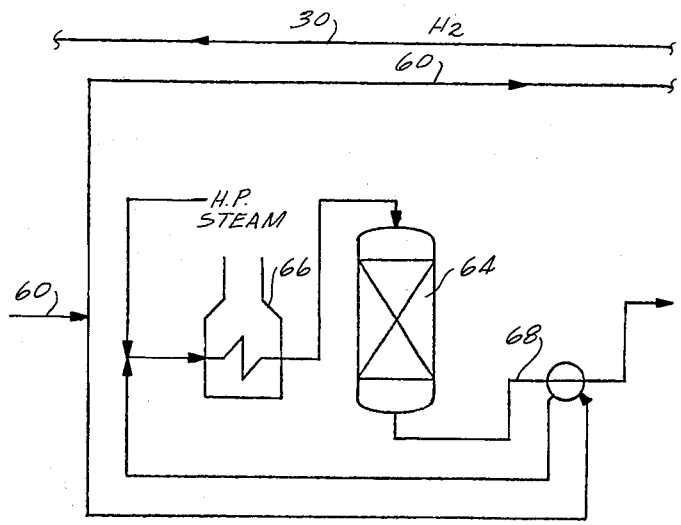
FIG_4A
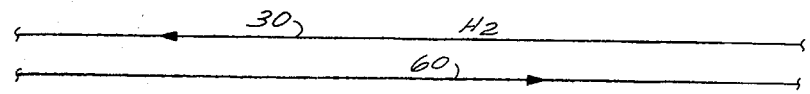
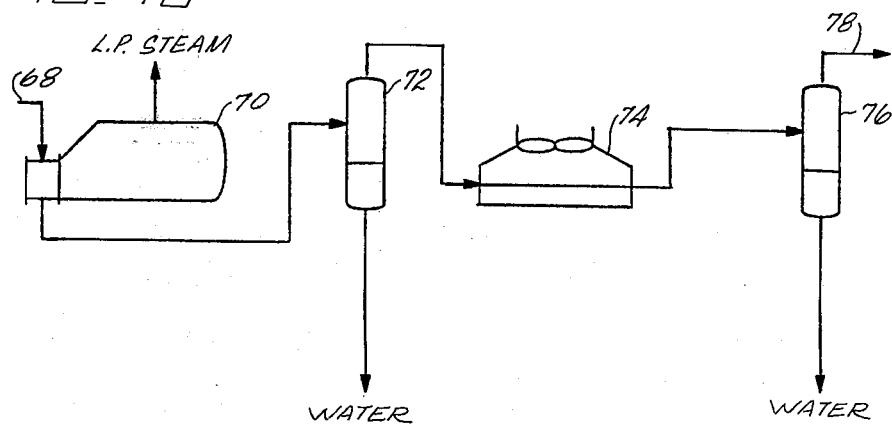
FIG_4B

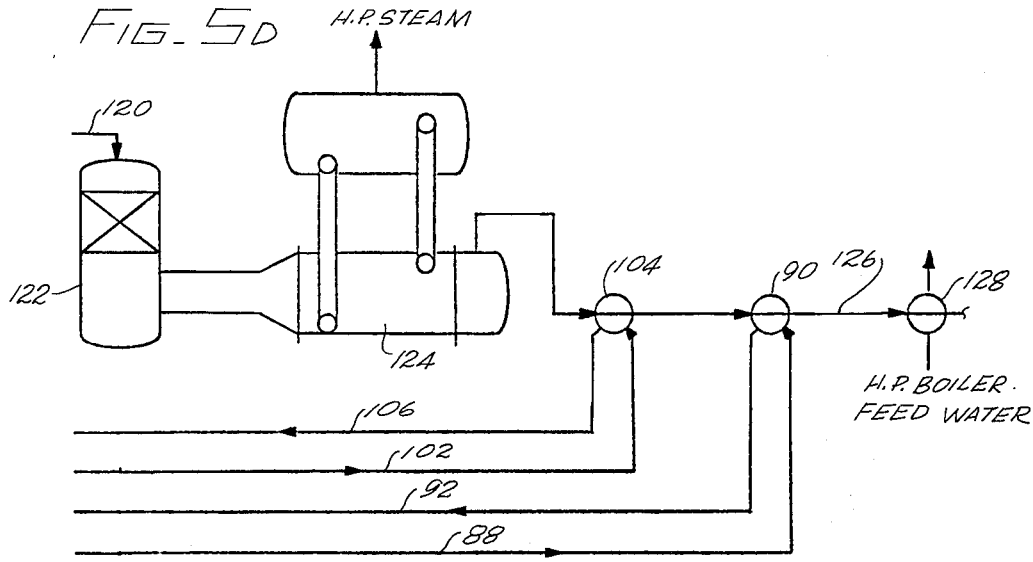
FIG_5D
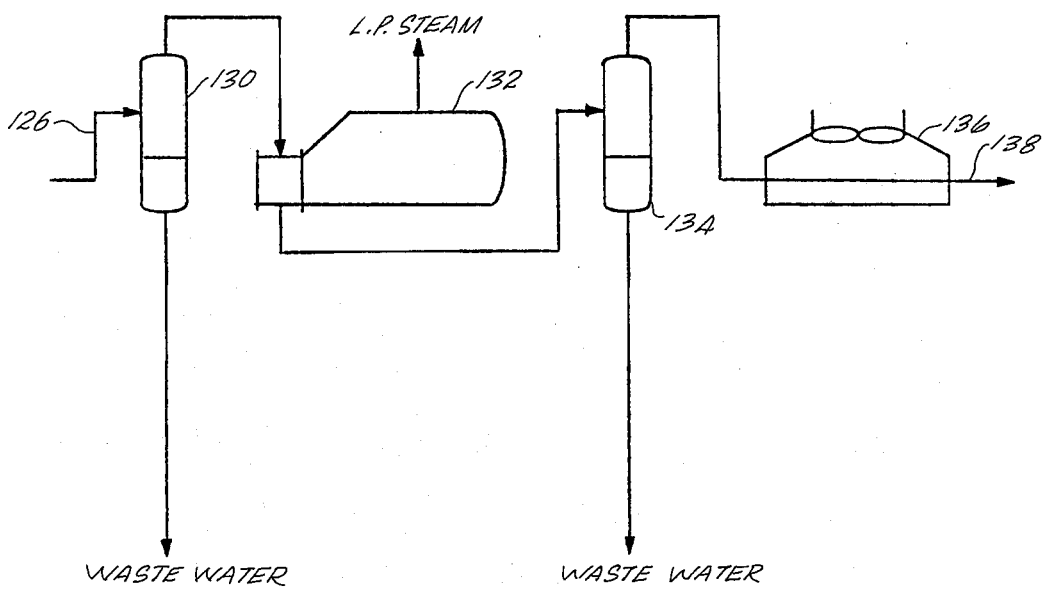
FIG_5E

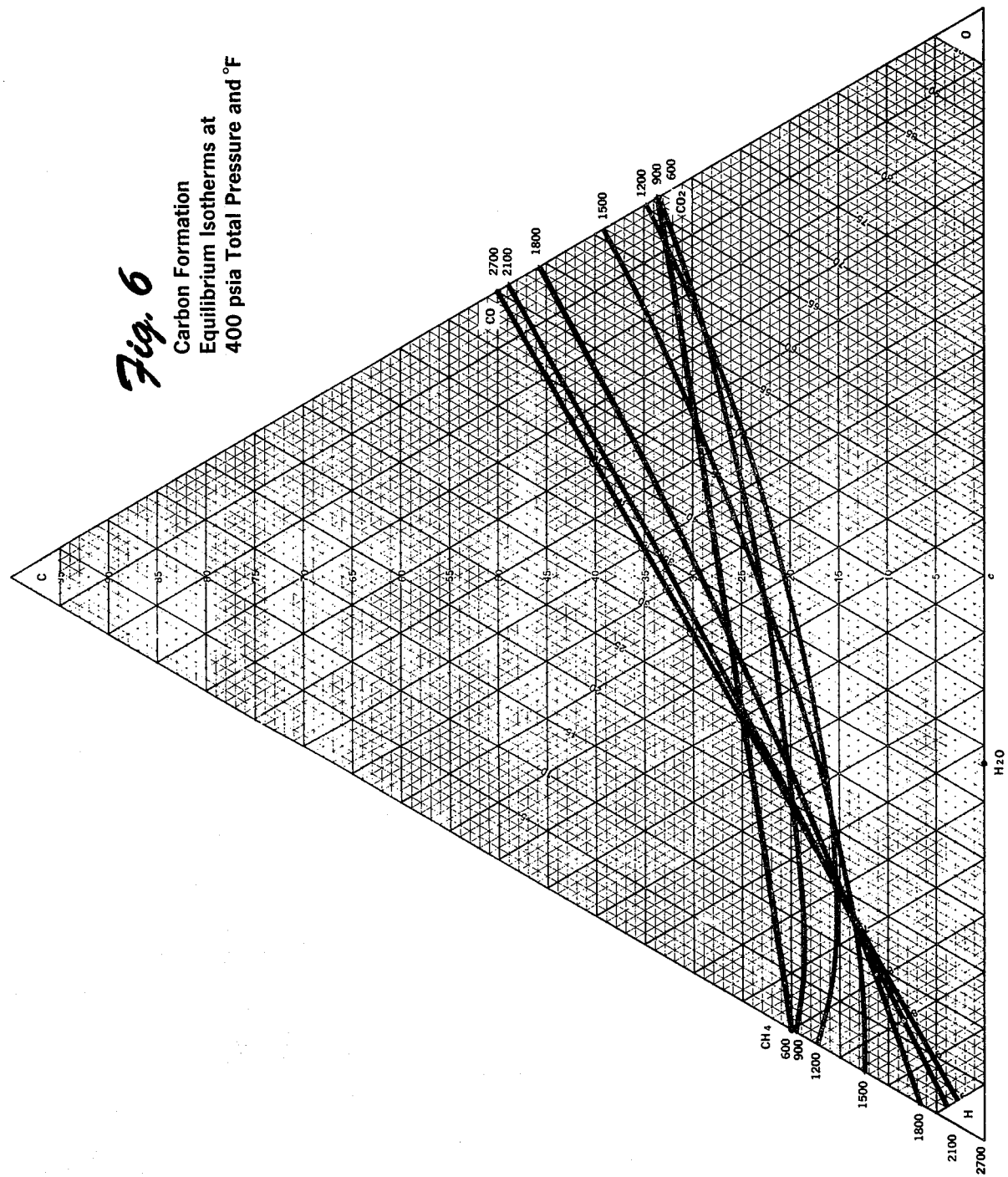

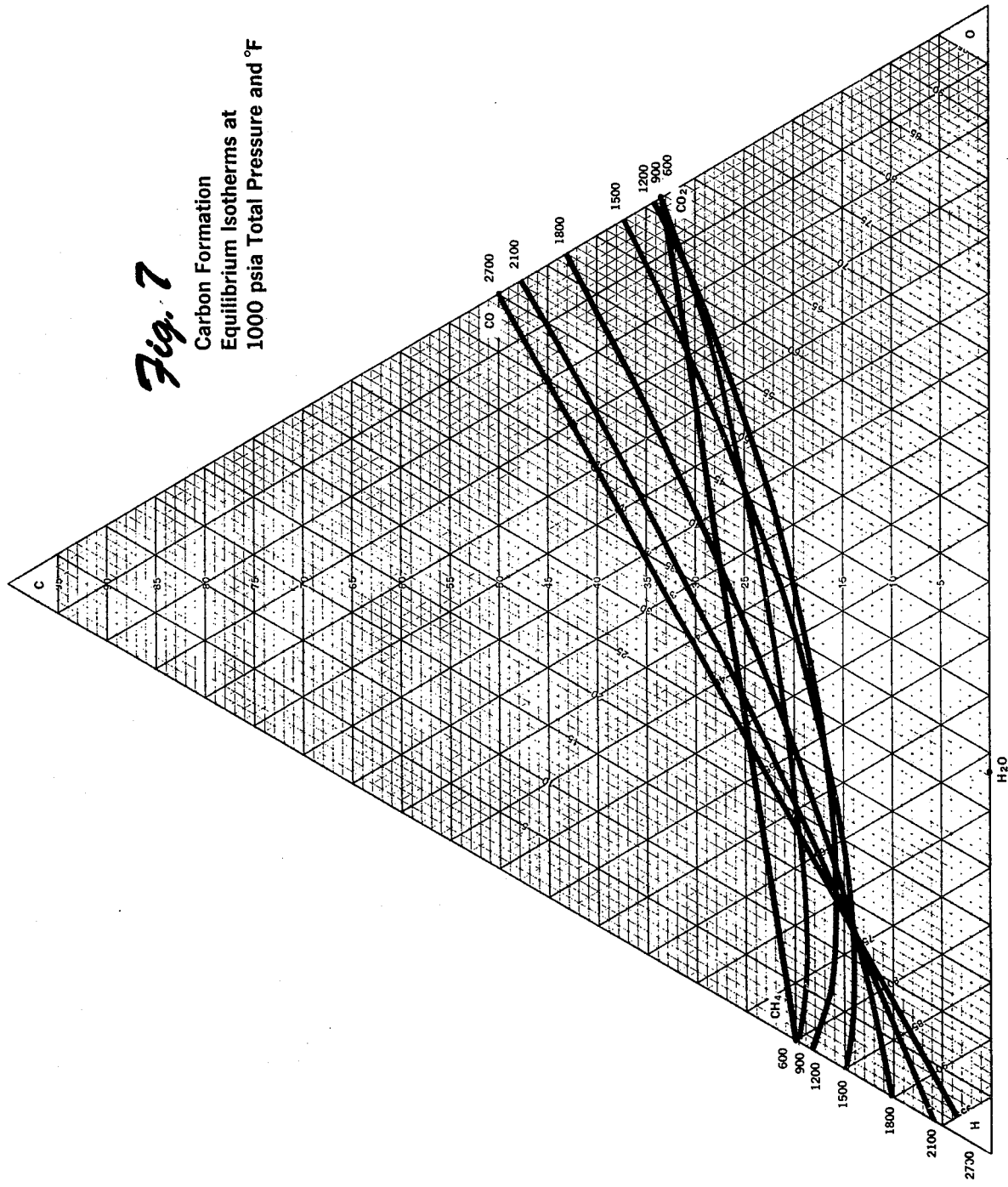
Fig. 7 Carbon Formation Equilibrium Isotherms at 1000 psia Total Pressure and °F Carbon Formation
Partial Equilibrium Isotherms at 270 psia Partial Pressure of Hydrogen, Carbon Monoxide, Carbon Dioxide and Steam and °F Carbon Formation
Partial Equilibrium Isotherms at
675 psia Partial Pressure of Hydrogen,
Carbon Monoxide, Carbon Dioxide and
Steam and °F

PROCESS FOR THE PRODUCTION OF SUBSTITUTE NATURAL GAS

CROSS REFERENCE TO RELATED APPLICATIONS

This is a continuation-in-part of our application Ser. No. 287,226 filed Sept. 8, 1972 now abandoned.

BACKGROUND OF THE INVENTION

Synthetic gaseous fuels have been produced for many years. The early processes were based on using heavy oils or coal in relatively low pressure cyclic thermal-operations which produced a gas of about 500 BTU/SCF. These processes disappeared from the United States with the advent of the natural gas production and transmission industry.

They also became uneconomical in other countries in the early 50's when the availability of low cost naphtha led to the commercial development of catalytic reforming of naphtha for the production of 500 BTU Town Gas.

Since the basic catalytic naphtha reforming process produces a lean gas high in hydrogen and carbon oxides and low in methane, considerable effort was expended to develop suitable process modifications to produce a gas high in methane so as to avoid the need for enriching with light hydrocarbons. These efforts successfully culminated in the development of the so called rich gas processes. Ultimately, catalytic naphtha reforming demonstrated a capability of producing a high BTU gas which was essentially all methane.

Aside from the limitations imposed by the required use of premium and ever-increasing high cost feed stocks such as naphtha, the main disadvantage of catalytic processes for the production of substitute natural gas is the requirement for operating at conditions very close to regions where carbon forms. The catalyst must be maintained in an active state to favor rapid formation of gaseous hydrocarbons. If the rate of reaction is reduced, tar formation and carbon producing reactions become competitors and result in catalyst degradation. These conditions require frequent changeover of the catalyst, often at most inopportune times.

Catalyst poisons such as sulfur, as well as high operating temperatures, also cause a loss of catalytic activity and the inevitable formation of carbon. Once carbon is formed and deposited on the catalyst, it catalyzes its own continued production, ultimately leading to loss of plant production.

SUMMARY OF THE INVENTION

According to the present invention, there is provided an essentially self-supporting fuels conversion process for the production of substitute natural gas from any carbonaceous material, mainly hydrocarbon liquids in the intermediate and heavy boiling range and/or solid carbonaceous fuels.

The process comprises first, partially oxidizing the carbonaceous materials in the presence of oxygen and steam, at elevated temperatures, generally, at temperatures in the range of about 1800°F to about 2700°F and at pressures ranging up to about 1200 psia to form a gas stream containing mainly hydrogen and the oxides of carbon with some methane and a minor amount of free carbon.

The oxygen employed is formed by compressing air, using high pressure steam generated within the process, condensing a portion of the air, separating the liquid from the uncondensed components of air, further separating additional nitrogen from the liquid by distillation and revaporizing the residual oxygen. Partial oxidation may be followed by a carburetion stage where an intermediate or heavy hydrocarbon is converted to methane, hydrogen and the oxides of carbon.

The gas stream so produced may be passed to a carbon separation stage where with cooling and the introduction of a light hydrocarbon fraction, combined with a heavy hydrocarbon stream, the carbon, including any aromatics, refractory hydrocarbons and tars, is removed, the resultant heavy hydrocarbon containing the removed constituents being recycled back to the partial oxidation stage.

Independent of whether carburetion is employed, the gas stream may, if desired, be treated for removal of sulfur compounds to the extent they are present and then passed directly to a methanation system. Treatment may involve, in general, first a high pressure physical or chemical absorption operation principally for hydrogen sulfide removal, followed by a caustic scrubbing stage, then treatment of the gas stream over a bed of sulfided cobalt-molybdenum catalyst where any residual sulfur compounds are converted to hydrogen sulfide, which is then removed from the gas stream by absorption or by reaction with zinc oxide. Alternatively, dilute alkaline washes may be used to hydrolyze other sulfur compounds to hydrogen sulfide. The net effect is to reduce the sulfur content of the gas stream to less than 1 ppm.

If carburetion is employed, a portion of the gas stream, after the initial hydrogen sulfide removal, when desired, may be passed through a water-gas shift conversion stage for generation of carbon dioxide and hydrogen. While not required, the carbon dioxide may be removed by absorption and all or a portion of the hydrogen may be added to the balance of the gas stream from initial hydrogen sulfide removal, when required, and/or all or a portion compressed and recycled to the carburetion stage, when required, to aid in preventing the intermediate hydrocarbon fraction from being converted to soot, aromatics, refractory hydrocarbons, and tar-like substances.

If carburetion is not used, a portion of the gas stream, after the initial hydrogen sulfide removal, where desired, may still be converted to hydrogen which is blended with the balance of the gas stream passing to the methanation stage, when required.

The mixture of gases directly from initial hydrogen sulfide removal, if employed, plus hydrogen, if any, may then be passed, if desired, through the additional residual sulfur removal operations described above.

All or a portion of the gas stream, after final sulfur removal, if employed, may then be mixed with steam and undergoes a water-gas shift reaction to achieve a carbon monoxide to carbon dioxide balance which prevents catalyst degradation and carbon deposition. Preferably, water-gas shift occurs in the presence of the wet methanation catalyst used to form methane. In the alternative, a known water-gas shift catalyst may be used in one or more separate water-gas shift reactors. Following the water-gas shift reaction the gas stream undergoes bulk or wet methanation without removal of carbon dioxide in which the principal reaction is methane forming as opposed to the water-gas shift reaction. The addition of normally excessive amounts of steam over that required to control carbon deposition is to be avoided as excessive steam will reduce the activity of the methanation catalyst and reduce its conversion efficiency by its effect on equilibrium.

Bulk or wet methanation occurs in one or more adiabatic or tubular wet methanation reactors employing a wet methanation catalyst which comprises from about 5 to about 35% by weight of at least one metal from the third period of Group VIII of the Periodic Table on a temperature stabilized, ceramic alumina base. Methane content may be increased to about 90% by volume exclusive of water and carbon dioxide. Methanation is carried out at a feed temperature above about 900°F and over a range from about 900°F to about 1600°F, at process pressures. Bulk or wet methanation reaction occurs at a feed temperature range from about 900° to about 1100°F with exit temperatures being up to about 1600°F. Since methane recycle is not employed for coolant purposes and temperatures are maximized, the exothermic heat of reaction is advantageously used for the production of high pressure steam for the process, employing the bulk methanation effluent. Steam at pressures up to the maximum tolerable by process equipment is generated. Steam pressures, therefore, may be up to 1500 psi or more and may range from about 400 to about 1500 psi, preferably from about 1000 to about 1500 psi. Where, as preferred, more than one wet methanator is employed in series, heat in the form of high pressure steam is extracted between each methanation stage. Space velocities for a feed of hydrogen, the oxides of carbon and steam may range from about 5,000 to about 20,000 SCFH per cu. ft. of catalyst.

The gas stream may then be passed to a cooling and water separation stage and optionally to a low temperature final dry methanation stage. Other intermediate temperature methanation stages may be employed prior to or following water removal. A carbon dioxide removal stage is included, if sufficient carbon dioxide has not been previously removed to produce an ultimate product where the methane content may be increased to about 99.9% by volume depending on product requirements.

Where carburetion is employed following partial oxidation, the gas from the partial oxidation reactor is fed to a carburetion reactor along with steam and, where desired, recycled hydrogen, and an intermediate or heavy boiling hydrocarbon fraction.

When employed there is formed in the carburetion stage methane, additional amounts of the oxides of carbon, hydrogen, and some minor amounts of carbon and possibly aromatics, refractory hydrocarbons and tars which may be separated downstream. Employing the carburetion stage increases the methane content of the gas stream from less than 1 to about 15% to 50% by volume on a dry basis.

A significant characteristic of the process is that there is always internally generated enough high pressure steam to meet the process needs and still enable the production of the oxygen for the partial oxidation stage without employing external power.

A significant aspect of the invention is that in the wet methanation stages there is employed a catalyst unique with respect to methanation. The catalyst as indicated consists of at least one metal of the third period of Group VIII of the Periodic Table, e.g. nickle deposited on a high purity, ceramic alumina base of a relatively low surface area and thermally stable over the temperature range at which methanation is to occur. Catalysts of this nature have been used for the reverse reaction, namely the reforming of methane. In the present invention they are used for the reverse reaction, namely methane generation and within a temperature range where reforming of methane has been practiced.

A peculiar feature of the catalysts is that they also promote the water-gas shift reaction which avoids the need for a water-gas shift reaction stage separate from the wet methanation stage to provide the hydrogen and oxides of carbon for methane production. In substance, their use enables water-gas shift and methanation to occur in the same wet methanation zone. This enables the feed of a gas of virtually any composition to the wet methanation zone without prior adjustments in the ratio of hydrogen to the oxides of carbon as the catalyst adjusts the composition of the feed to meet the requirements for methanation.

The relative activity of the catalysts for the methanation reaction is dependent upon the operating pressure and temperature and the molar ratio of steam to dry gas in the mixed feed gas stream entering the wet methanation reactor. At temperatures above about 900°F, preferably above 1000°F, the reactivity of hydrogen toward the carbon oxides, i.e., CO and $CO_2$ is high which generally results in a high effective catalyst activity despite its low metal content. At this temperature and higher, the catalyst crystallite size is relatively large providing reduced catalyst surface upon which the methanation reaction will occur. However, it has been found that in the temperature range of 900° to 1500°F, a reduced catalyst surface is still adequate to provide an effective catalytic activity.

At the elevated methanation temperatures employed, the presence of steam does not have a detrimental effect upon such catalysts. Where conventional methanation catalysts have been employed, however, it is accepted practice to maintain operating temperatures including exit temperature, below 900°F for fear of rapid catalyst deterioration as well as deactivation as by the deposition of carbon. This has previously necessitated the recycle of cooled reaction products to insure methanation at temperatures below 900°F. This has been expensive since as much as 10 to 20 cooled volumes of product gas are recycled for temperature control per volume of product gas produced. As no recycle need be employed in practice of this invention, the power required for recycle is conserved and other useful power in the form of high pressure steam produced. These are, therefore, distinct economic advantages not heretofore available in the art of methane production.

THE DRAWINGS

FIGS. 1A, B, C, D, E and F illustrate the schematic operation of the system showing all stages which may be employed and several schemes available for methane production. The dashed lines indicate optional bypassing of a stage which is normally used, but eliminated if the composition of the gas stream so permits;

FIG. 2 illustrates the oxygen generation system for the partial oxidation reactor;

FIGS. 3A, B, and C illustrate the operations of partial oxidation and gas purification carried common to schemes where carburetion is employed and where carburetion is eliminated;

FIGS. 4A, B and C show additional water-gas shifting and carbon dioxide removal operation stages which may be used whether carburetion is employed or is eliminated;

FIGS. 5A, B, C, D, E, F and G show the operation of the final sulfur removal, if necessary, and methanation systems independent of whether carburetion is employed or eliminated;

FIG. 6 is a ternary diagram illustrating equilibrium carbon formation isotherms at an operating pressure of 400 psia;

FIG. 7 is a ternary diagram illustrating equilibrium carbon formation isotherms at an operating pressure of 1000 psia;

DESCRIPTION

Figure 1C:
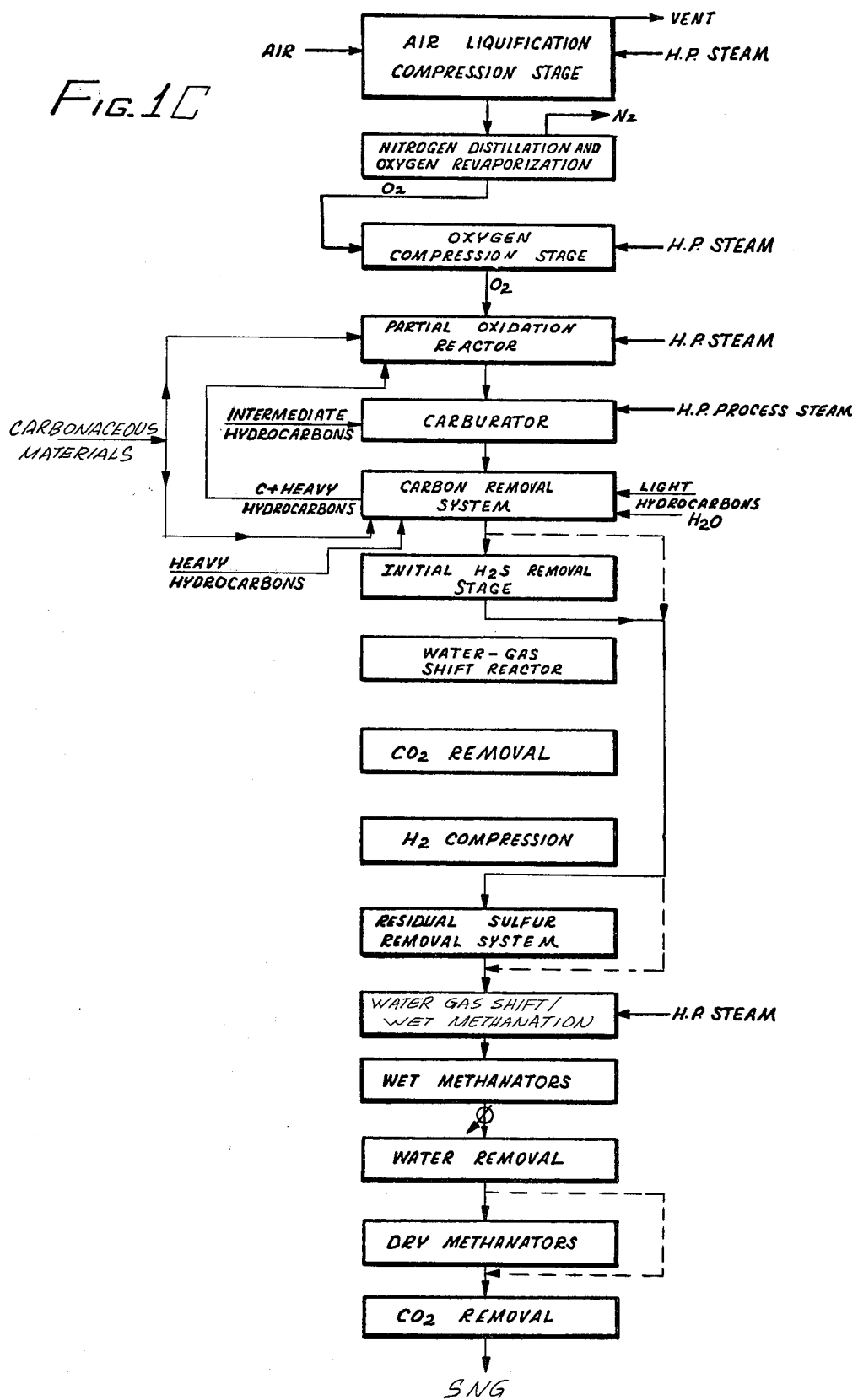

According to the present invention, there is essentially provided a self-contained fuels conversion process for the production of substitute natural gas from any carbonaceous material to form a product containing up to 99.9% by volume methane on a dry basis.

The process is also carried out in a manner which avoids potential carbon formation and deposition on the methanation catalysts employed.

FIGS. 1A through 1F show schematically the various alternative routes employed in carrying out the process of this invention.

With reference to them, inherent to each, is the production of oxygen for use in a partial oxidation reactor, the oxygen being formed by liquefication of air using high pressure steam (HP Steam) generated within the process.

Following liquefication through compression and cooling and separation of the uncondensed gases, a substantial amount of the nitrogen is distilled from the liquid to leave relatively high purity oxygen which is then vaporized and compressed, again using high pressure steam generated within the process, to a pressure sufficient for introduction to a partial oxidation reactor which is also common to all process schemes. From there, various alternatives are possible, as will be described below.

With reference to FIG. 1A, the gas stream leaving the partial oxidation reactor and containing predominantly hydrogen and the oxides of carbon is passed to a carbon removal system, which is also common to all the schemes, where through water cooling and the introduction of a light hydrocarbon and a heavy hydrocarbon, the carbon and any aromatics, refractory hydrocarbons and tars present in the gas stream are removed for recycle back to the partial oxidation reactor.

Following this, if the gas stream contains sulfur compounds, because of their presence in the carbonaceous materials employed, the gas stream may be passed through an initial hydrogen sulfide removal stage. Where the gas stream does not contain significant amounts of sulfur compounds this stage may be bypassed. The gas stream may, if desired, be passed through a second sulfur removal system to reduce sulfur content to less than 1 part per million sulfur compounds. Again, this stage may be bypassed if the raw materials employed do not contain undesirable quantities of sulfur compounds from a product standpoint or the sulfur content of the gas stream is already sufficiently low.

A portion of the gas stream is then mixed with stream and passed through a water-gas shift reaction zone. Because the catalyst employed for wet methanation is also capable of promoting the water-gas shift reaction, the initial portion of an initial wet methanation reactor may be used for water-gas shift. A conventional water-gas shift catalyst may be added to aid in this purpose. Alternatively, a separate water-gas shift reactor may be employed. This is, however, unnecessary as a feature of the process of this invention is that catalyst employed for at least the first stage of wet methanation will also under operating pressures and temperatures cause a water shift reaction to occur simultaneous with methane formation. However, even if a separate water-gas shift reactor is employed, there is no need to remove carbon dioxide prior to methanation. This feature is absent in prior art processes. Where a separate water-gas shift reactor is employed, generally only a portion of the gas stream is fed to the water-gas shift reactor and the effluent mixed with the balance of the gas bypassing the water-gas shift reactor along with any additional steam, if necessary, to prevent carbon deposition and fed to the methanation reactor system. However, the total quantity of steam added before and after water-gas shift is normally limited to that required to suppress carbon formation as excess water can suppress methane yield.

The gas stream is then passed through a series of high temperature adiabatic or tubular wet methanators containing a low metal content methanation catalyst as hereinafter defined with intermediate cooling and generation of high pressure steam for use in the process, a water removal stage and, where desired, one or more low temperature wet or dry methanation stages, to increase gas stream methane content as required and a final carbon dioxide removal stage. While all of the steam is fed to the first wet methanation reactor, the feed stream of hydrogen and the oxides of carbon may be divided among a plurality of wet methanators in series.

With reference to FIG. 1B, there is shown an alternative scheme to FIG. 1A, which involves passing a portion of the gas stream after the carbon removal stage and the initial hydrogen sulfide removal stage, when required, through an initial water-gas shift reactor, then to an initial carbon dioxide removal stage to provide hydrogen for the methanation reaction. This can eliminate or reduce the size of the final carbon dioxide removal stage. Also, mass velocities through the bulk or wet methanators are reduced which result in less pressure drop.

With reference to FIG. 1C, there is introduced a carburetion stage following the partial oxidation reactor where intermediate or heavy hydrocarbons and high pressure steam are combined with the gas stream to form methane, additional hydrogen and oxides of carbon. The methane content of the gas stream, through the use of the carburetor may be increased to as much as 50% by volume on a dry basis. The balance of the scheme is identical to that described with reference to FIG. 1A.

Figure 1D:
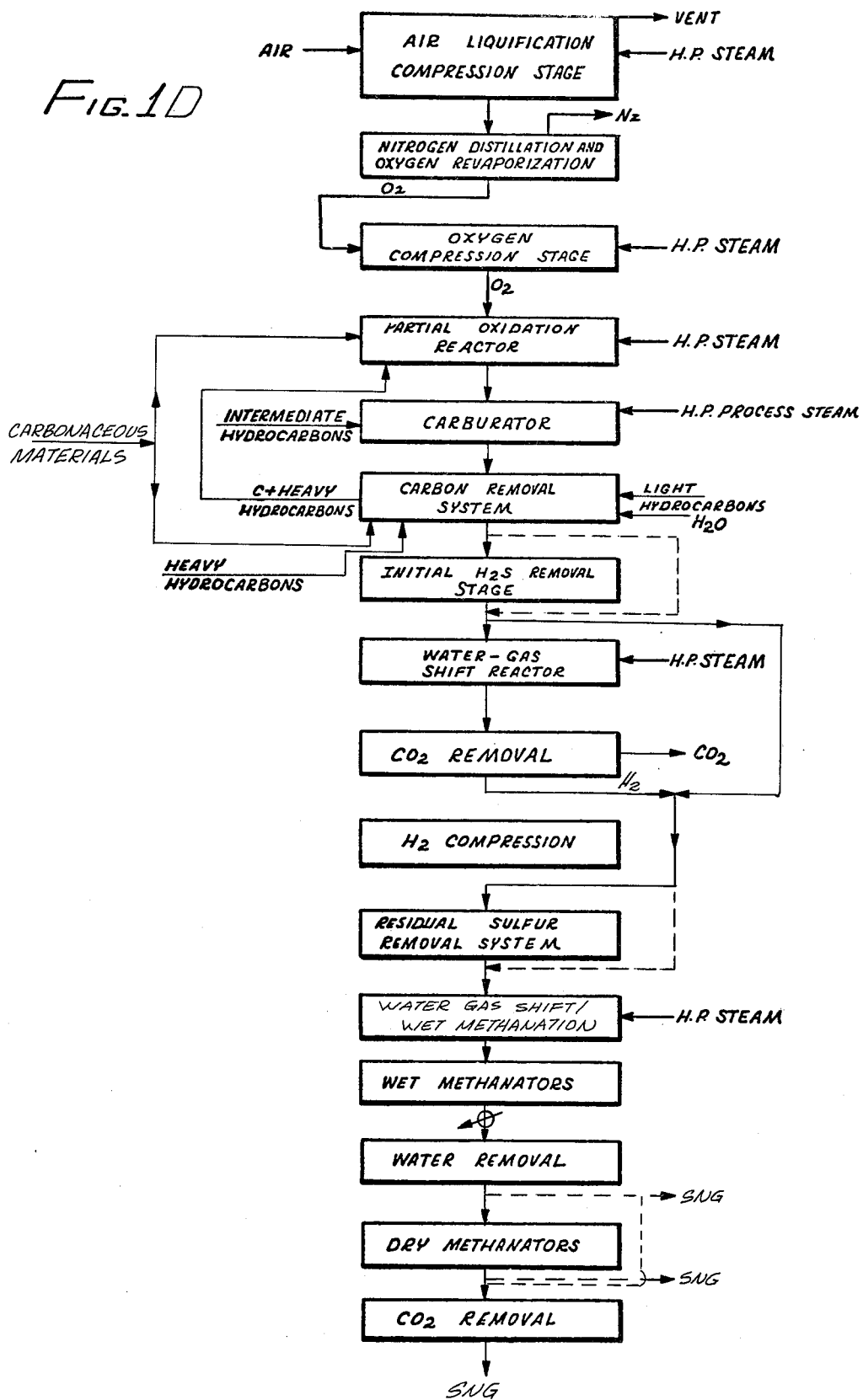

FIG. 1D is identical to the scheme shown in FIG. 1C but adds the initial water-gas shift reactor and carbon dioxide removal stage for hydrogen enrichment of the gas stream as described in FIG. 1B, which can eliminate or reduce the need for a final carbon dioxide removal stage.

Figure 1E:
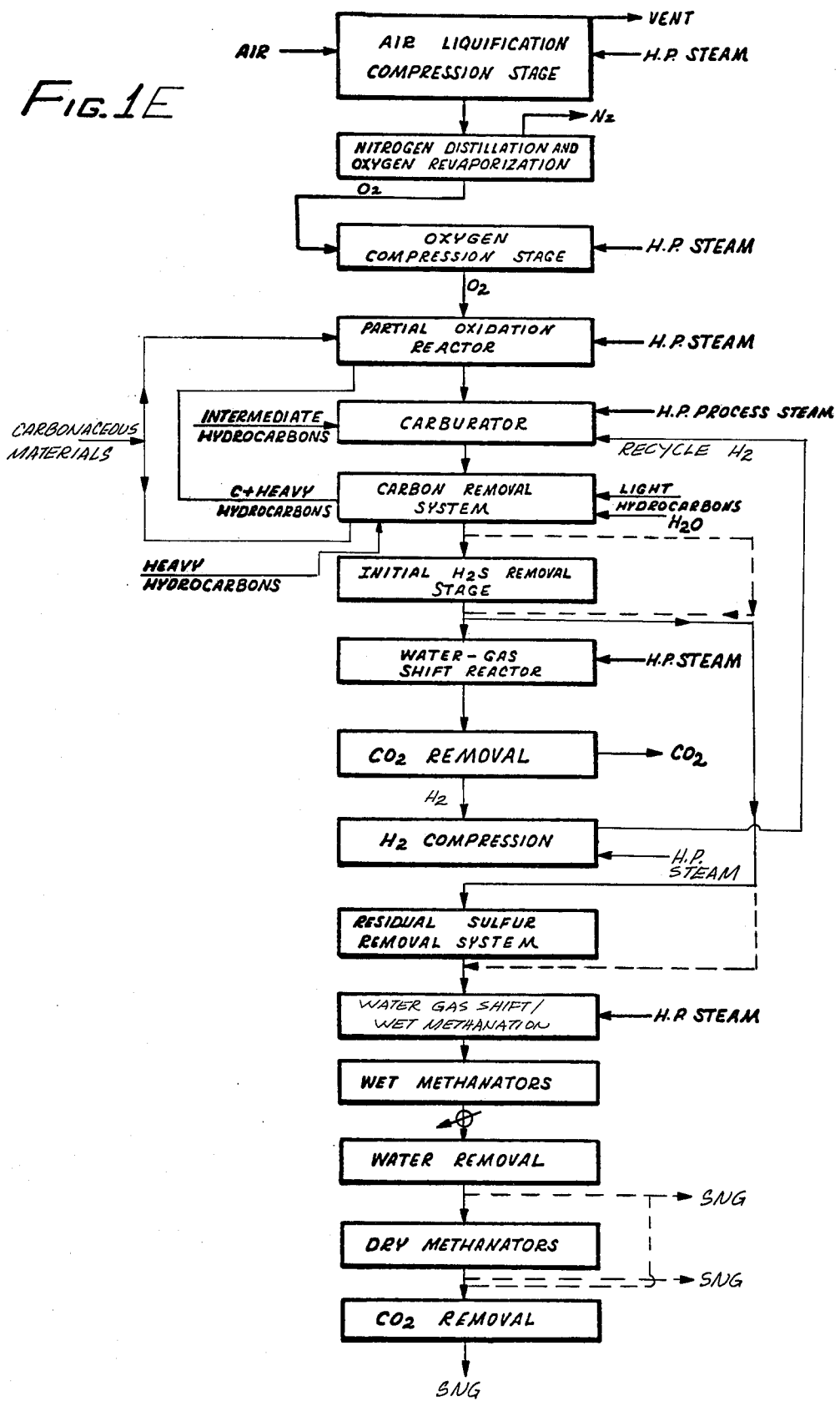

FIG. 1E is identical to FIG. 1D, except that after the carbon removal stage a portion of the gas stream is passed through a water-gas shift reactor and a carbon dioxide removal stage. All of the resultant hydrogen is compressed and returned to the carburetion stage. Again employing initial carbon dioxide removal can avoid or reduce the need for its removal at the end of the operation.

Figure 1F:
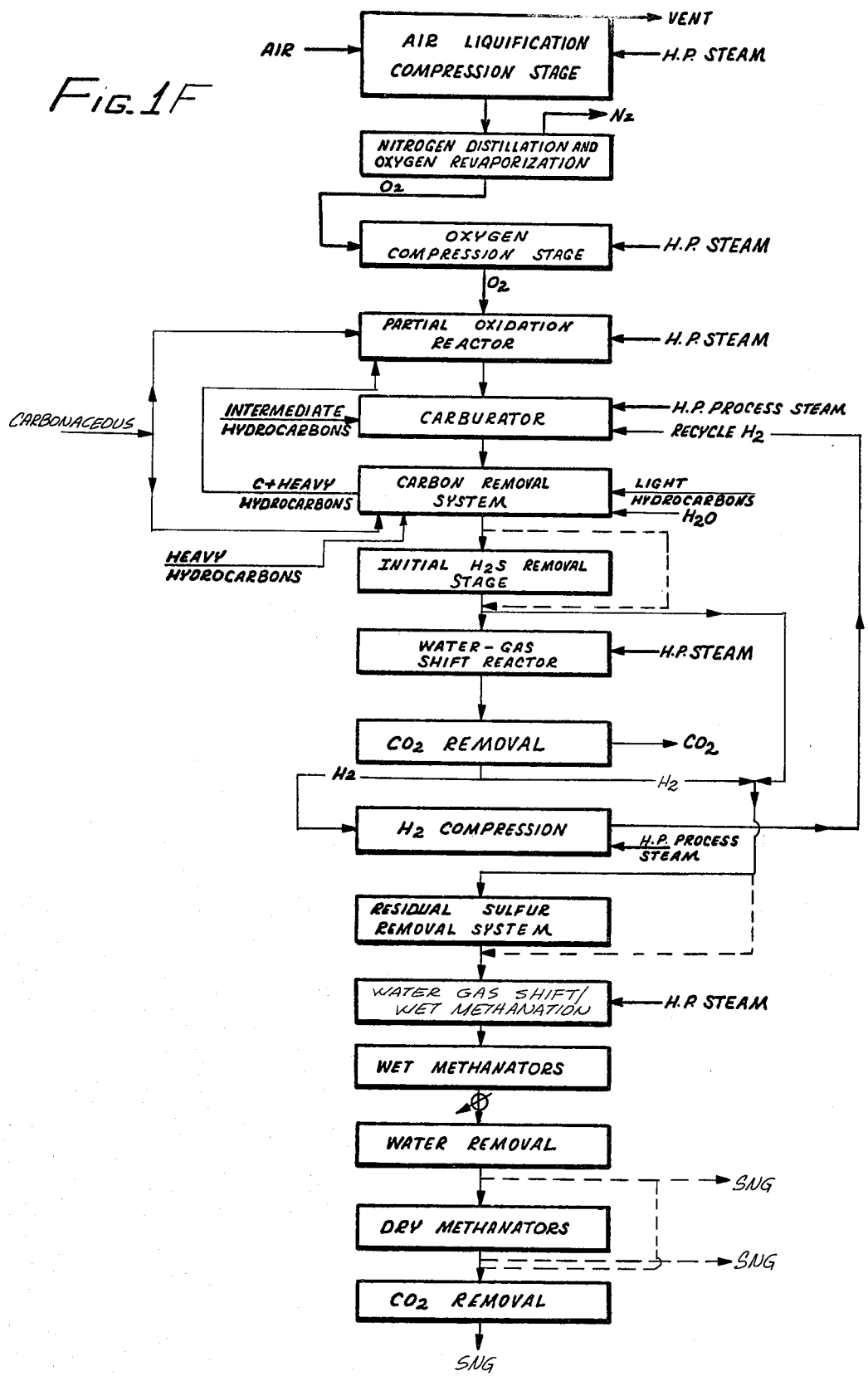

FIG. 1F is identical with FIG. 1E, except that a portion of the hydrogen is compressed and recycled to the carburetor and the balance combined with the process gas stream.

Hydrogen compression and recycle to the carburetor aids in the control of carbon, aromatics, refractory hydrocarbon and tar formation.

Because of initial carbon dioxide removal, it may again, in this instance, be permissible to avoid or reduce the size of the final carbon dioxide removal stage. Again, as to all schemes a dry methanator is optionally employed, depending upon the desired methane content of the product gas stream.

By the practice of the various schemes described above, there may be produced a gas stream containing on a dry basis, as high as 99.9% methane.

DEFINITIONS

As used herein, by "carbonaceous materials" is meant any solid or liquid hydrocarbon source generally available at low cost. It may be coal, lignite, peat, a slurry of coal, a whole crude, the heavy ends of a distillation operation, propane deasphalting bottoms, visbreaking tars, crude hydrocarbons formed from the pyrolysis of municipal waste, middle distillates and the like.

By the term "heavy hydrocarbon" there is meant generally the heavy ends or bottoms of a distillation operation and includes tars, asphalts, residual oils and reduced crudes, as well as aromatics and refractory hydrocarbons and the like.

By the term "intermediate hydrocarbon," there is generally meant what would be termed a middle cut distillate from a fractional distillation operation or a purchased fraction of equivalent boiling range. While no wise limiting, examples of intermediate hydrocarbons include naphthas, gasolines, kerosenes, gas oils and the like. This also includes aromatics and refractory hydrocarbons.

By the term "light hydrocarbon" is meant what would be termed the upper fraction of a distillation operation and includes such compounds as propane and butane.

With respect to the heavy hydrocarbons and intermediate hydrocarbons, they generally contain free or bound sulfur which during the partial oxidation and/or carburetion reactions are converted to hydrogen sulfide, carbonyl sulfide, carbon disulfide and the like. This generally makes the use of one or more sulfur removal stages necessary for product quality.

By the term "high pressure steam" there is meant steam at as high a pressure as is consonant with equipment for its use. By present technological standards the steam is employed at a pressure up to about 1500 psi. Steam pressures can, therefore, generally vary from about 500 psi or less to about 1500 psi or more, more usually from about 1000 to about 1500 psi or more.

By the term "methanation catalyst" there is meant a metal of the third period of Group VIII as defined by the Periodic Table of Mendeleef supported on an alumina, silica, or alumina-silica support.

Of these, the metals cobalt and nickel are preferred, with nickel particularly preferred.

By the term "low metal content wet methanation catalyst," there is meant a catalyst containing from about 5 to about 35% by weight of the metal in the free metal form contained on a thermally stable ceramic alumina support. Thermal stability is induced by heat treating the support by calcining and the like at a temperature above that encountered in wet methanation, e.g. above 1600°F prior to depositing the metal on the support. The preferred supports are of relatively low surface area and the alumina content is preferably maximized to prevent other constituents such as silica from being volatilized and contaminating heat exchange surfaces. Catalysts with the preferred supports are known in the art for the reforming of methane and other hydrocarbons.

By the term "high metal content methanation catalyst," there is meant a methanation catalyst containing more than 30 weight percent of the metal in the free metal form on a conventional, silica, alumina or silica-alumina base.

By the term "wet methanation" there is meant the inclusion of low or high pressure steam along with the mixture of gases containing oxides of carbon and hydrogen which are to be methanated.

The ensuing is a detailed description of the process of this invention including a discussion of the various parameters involved to achieve efficient, low cost conversion of carbonaceous materials to methane.

OXYGEN PRODUCTION STAGE

The first aspect of every scheme employed in the process of this invention is the production of oxygen for use in the partial oxidation reactor.

With reference now to FIG. 2 high pressure steam (H.P. Steam) generated within the process is used to drive steam turbine 10 which, in turn, drives air compressor 12, preferably a centrifugal compressor, to compress the air to the point where a portion is liquefied upon cooling, the balance being vented. The compressed air is then passed to air separation unit 14 where it is cooled and condensed and the non-condensible vent gases separated. The nitrogen and other components of the air stream along with some oxygen are distilled off from the liquid and also vented to the atmosphere. The product oxygen leaves air separator 14 at approximately atmospheric pressure and in a vapor state and may be re-compressed to the pressure required by the partial oxidation reactor.

There is again employed steam turbine 16, again using high pressure steam generated within the process to drive compressor 18, preferably a centrifugal compressor, to compress the oxygen required for the partial oxidation reaction.

PARTIAL OXIDATION-CARBURETION OPERATIONS

Figure 3B:
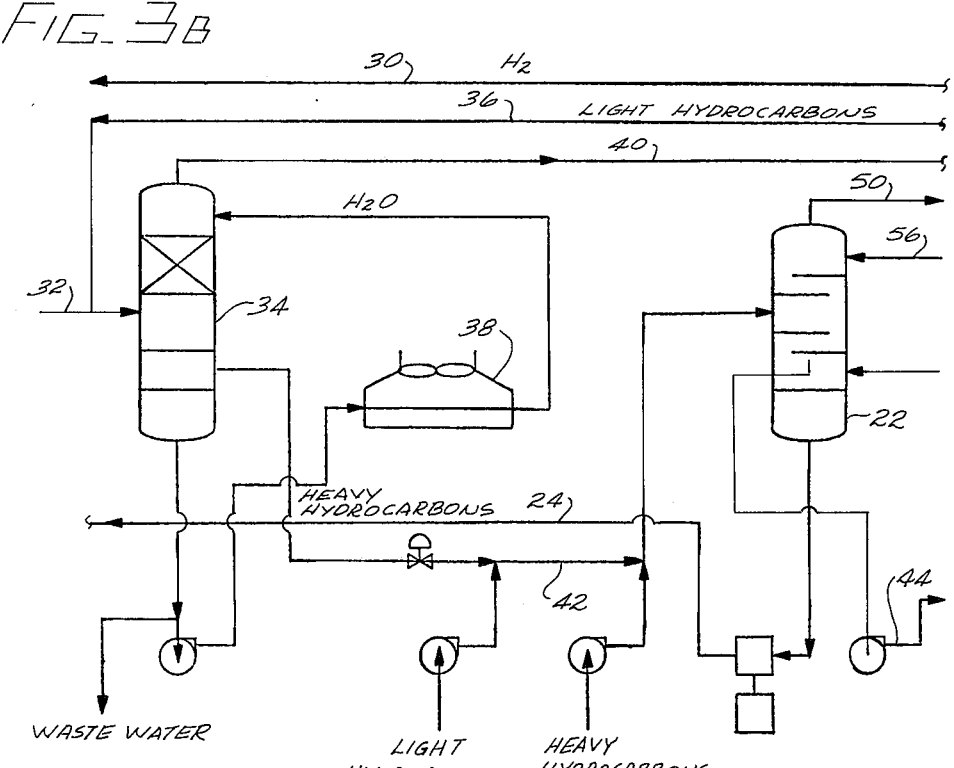
Figure 3C:
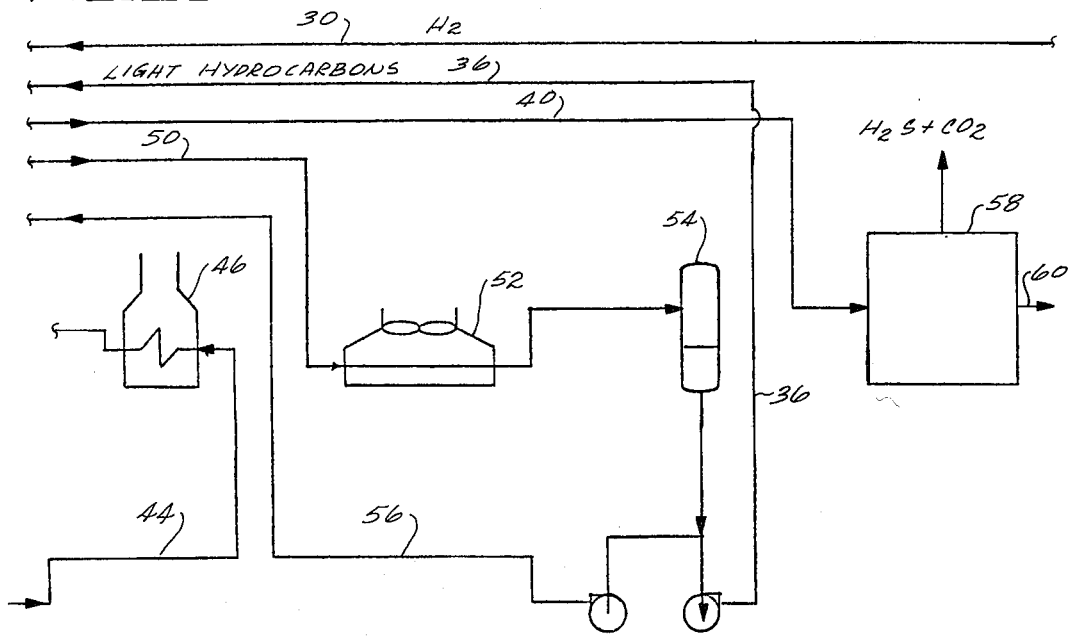

With reference now to FIGS. 3A, B and C, oxygen from line 20, high pressure steam (H.P. Steam) from the process, the carbonaceous materials including heavy hydrocarbons containing carbon, tars, aromatics, refractory hydrocarbons and the like from fractionator 22 passing along line 24 proceed to partial oxidation reactor 26.

Reaction in the partial oxidation reactor 26 is carried out at a temperature from about 1800°F to about 2700°F at pressures ranging up to about 1200 psia or more, typically from about 20 to about 1200 psia or more.

The effluent from the partial oxidation reaction 26 comprises a stream which generally contains, on a dry basis, about 45 percent hydrogen, about 55 percent of the oxides of carbon, the predominant constituent being carbon monoxide, some methane and traces of carbon.

The effluent may then be passed through carburetor 28 where there is added steam, preferably high pressure steam, an intermediate hydrocarbon or any other heavier hydrocarbon suitable for carburetion, whose selection is made normally depending upon the cost and supply of carbonaceous materials.

There may be added high pressure steam generated within the process and, where desired, recycled hydrogen generated downstream in line 30 which aids in preventing the hydrocarbon from being converted to soot, aromatics, refractory hydrocarbons, and tar-like substances.

Reaction in the carburetor occurs at about partial oxidation reaction operating pressures and substantially lower temperatures, normally at some temperature above about 1500°F. There is formed in carburetor 28 more oxides of carbon and hydrogen, with a substantial portion of the intermediate hydrocarbon introduced being converted to methane to produce a gas stream containing about 15% to about 50% by volume methane on a dry basis.

The gas stream then passes through waste heat boiler 30 to generate high pressure steam for use in the process.

If carburetor section 28 is eliminated the effluent from the partial oxidation reactor 26 is passed directly to waste heat boiler 30.

The effluent from waste heat boiler 30 in either event is sent through line 32 to quench scrubber 34 along with a light hydrocarbon fraction in line 36 and is quenched by the water cooled in air cooler 38 which is delivered to quench scrubber 34 at temperatures close to ambient.

In scrubber 34, three important functions are accomplished. First, the light hydrocarbon extracts any carbon, tars, refractory hydrocarbons and aromatics from the gas stream, while water is used to cool the gas stream and to cool and condense the light hydrocarbon. There also occurs a phase separation wherein the water employed is recirculated through the air cooler or is passed to waste, and condensed light hydrocarbons, carbon, tars, refractory hydrocarbons, and aromatics formed are passed to fractionator 22 along with a heavy hydrocarbon, and the carbon free gas stream is passed by line 40 to hydrogen sulfide absorber 58.

Quench scrubber 34 operates at substantially the same pressure as the partial oxidation reactor 26 with some losses occurring because of the pressure drops in the system but at a much lower temperature.

The gas stream leaving quench-scrubber 34 in line 40 may contain up to 50% by volume methane, depending upon whether carburetor 28 is, or is not, employed, but may contain, depending on the nature of the carbonaceous feed stocks, hydrogen sulfide, carbon disulfide and carbonyl sulfide as impurities.

The light hydrocarbon containing carbon, tars, refractory hydrocarbons and aromatics is passed by line 42 to fractionator 22 where there is, again, added makeup light hydrocarbon and the heavy hydrocarbon, either purchased or obtained by fractionation of a crude hydrocarbon, the heavy ends of which provide the feed to partial oxidation reactor 26.

Fractionator 22 is generally operated at a relatively low pressure in order of 30 psia. The heavier fraction containing carbon, tars, refractory hydrocarbons and aromatics is taken off at the bottom. A side stream is passed by line 44 through reboiler heater 46 for recycle back to fractionator 22. The bottoms are returned by line 24 to the partial oxidation reactor 26 for reconversion to the oxides of carbon and hydrogen.

The light hydrocarbon fraction is passed by line 50 through air cooled condenser 52 to separator 54 where a portion of the condensate is returned along line 36 to quench scrubber 34 and the balance recycled along line 56 to reflux fractionator 22.

As indicated, the carbon free gas stream which may contain up to about 50 percent methane, depending on whether carburetion is employed, or only a minor amount of methane if carburetion is not employed, is passed, if necessary, to a first hydrogen sulfide absorber 58 by line 40 where some portion of hydrogen sulfide present is separated by conventional, physical or chemical absorbents for hydrogen sulfide. This step may be eliminated if the feed stock is relatively sulfur free.

Figure 5A:
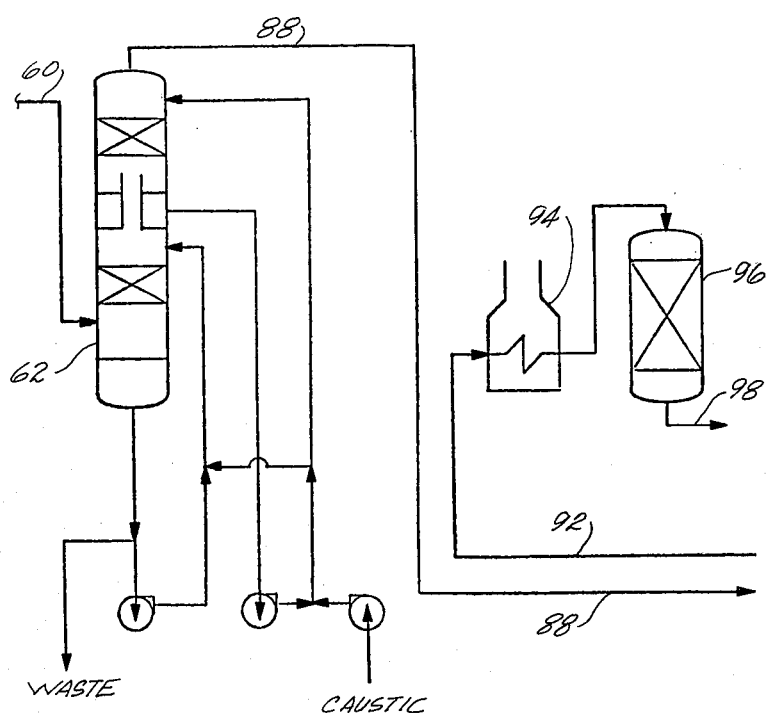
Figure 5B:
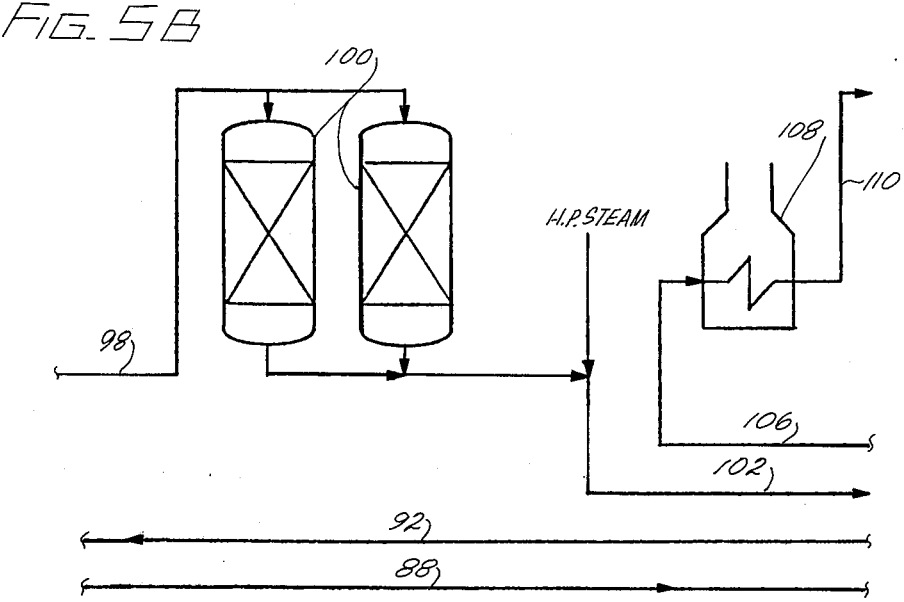

Whether or not carburetion is employed the gas stream, after passing through hydrogen sulfide absorber 58, may pass directly by line 60 to caustic scrubber 60 of FIG. 5A.

Figure 4C:
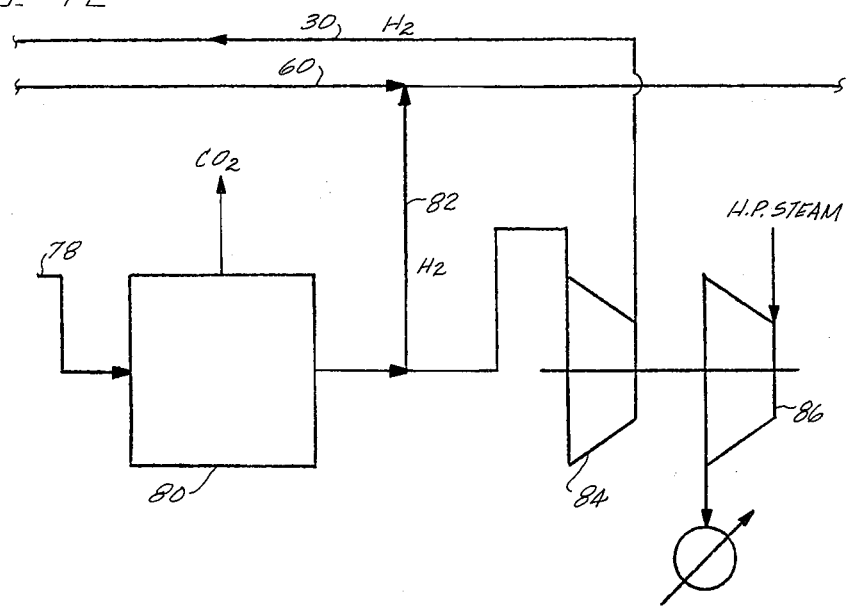

Intermediate Operations for the Purpose of Producing Hydrogen for Carburetion or Methanation With reference now to FIGS. 4A, B and C. where carburetion with hydrogen recycle is employed or hydrogen is required for methanation, all or part of the gas stream in line 60 may be treated in water-gas shift reactor 64, with the option of splitting the gas stream and passing portions along bypass 60 direct to caustic scrubber 62, shown in FIG. 5A, and the balance into water-gas shift reactor 64. There, the gas after being combined with high pressure process steam (H.P. Steam), is passed through startup heater 66 and reacted at elevated temperatures at pressures proportionate to that used in partial oxidation reactor 26, but reduced by normal pressure reductions due to passage through the process system.

The effluent from water-gas shift reactor 64 is passed by line 68 to low pressure steam generator 70, then to separator 72, air cooler 74 and to separator 76 on to high pressure carbon dioxide absorber 80 by line 78, where excess carbon dioxide is discarded. Employment of carbon dioxide removal at this stage can eliminate or reduce the need for carbon dioxide removal at the end of the process.

Following carbon dioxide separation, the hydrogen in the gas stream may be passed all or in part by line 82 to bypass stream 60 for passage with the main gas stream to the caustic scrubber 62.

The balance, if desired, is compressed in compressor 84, driven by high pressure steam turbine 86 using process generated steam (H.P. Steam) for recycle back to carburetor 28 for recombination with the main gas stream.

It is equally feasible, however, to bypass the initial water-gas shift reactor, carbon dioxide removal stage and hydrogen compression stage.

Methanation Operations

With reference now to FIGS. 5A, B, C, D, E, and F, as previously indicated, the gas stream prior to going to the methanation operation, independent of whether carburetion is employed, may be passed through a caustic scrubber 62 or a similar sulfur removal system where hydrogen sulfide, carbonyl sulfide, carbon disulfide remaining in the gas stream are reduced to a concentration of less than about 10 parts per million, again, based on a dry basis.

The caustic scrubber 62 is operated at essentially the same pressure as in partial oxidation reactor 26 with some losses occurring because of pressure drops in equipment, generally using a solution having a caustic concentration of 20% – 40% by weight. A prewash with a dilute caustic of about 3 weight percent can be used to hydrolyze carbonyl sulfide or carbon disulfide.

The gas stream from the caustic scrubber 62 is passed by line 88 through preheater 90 and returned by line 92 and start up heater 94 to a bed of sulfided cobalt-molybdenum catalyst 96 or its equivalent, to convert whatever sulfur compounds remain to hydrogen sulfide. The gas stream containing hydrogen sulfide is then passed by line 98 to one or more beds 100 where the hydrogen sulfide present is absorbed, the preferred media employed being zinc oxide which is operative in the limited amount of moisture present in the gas system. This reduces the sulfur content of the gas stream to less than about 1 ppm. Where sulfur is already present as hydrogen sulfide, the cobalt-molybdenum catalyst may be omitted.

The gas stream, indpendent of its methane content, is then passed through a plurality of bulk, wet methanation zones containing a low metal content wet methanation catalyst where in the presence of added water as steam, the methane content is increased to that desired for the end product. In at least the first wet methanation zone a water-gas shift reaction occurs, as is evidenced by an increase in hydrogen and carbon dioxide and a reduction in water and carbon monoxide and a rapid temperature rise. There is also an increase in the methane content of the gas stream.

While not required, high pressure process steam may be added to a portion of the gas stream and the gas stream passed by line 102, through auxiliary preheater 104, returned by line 106 to start up heater 108, and passed by line 110 to water-gas shift reactor 112. The balance of the gas stream bypasses the water-gas shift reactor. In water-gas shift reactor 112 some of the carbon monoxide is converted to carbon dioxide. Reaction is carried out at temperatures from about 600°F to about 1100°F.

From water-gas shift reactor 112, which typically employs a conventional chromium promoted iron oxide catalyst, the gas stream may be passed through water-gas reactor waste heat boiler 114 or bypass it. Hot and cold water-gas shift effluents and unshifted gases are blended and pass through a first wet methanator reactor 116 where there is employed a low metal content wet methanation catalyst, preferably a low nickel content catalyst.

Equally convenient is to combine water-gas shift with methanation as it has been found that the low metal content wet methanation catalysts will serve to the extent required for methanation, to shift the gas stream to provide the oxides of carbon and hydrogen required for methane formation while avoiding carbon deposition. Water-gas shift in the wet methanation reactor will occur simultaneous with methanation, i.e., methane formation at temperatures from about 900° to about 1400°F.

It is well known that high nickel content catalysts are used to promote methanation and that low metal content catalysts on a thermally stabilized ceramic alumina base are used to promote reforming, namely, the conversion of methane by the reaction:

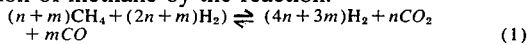

$(n+m)CH_4+(2n+m)H_2 \rightleftharpoons (4n+3m)H_2+nCO_2+mCO$ (1)

In the process of this invention the low nickel content reforming type catalysts cause, at the temperatures and pressures employed for the reverse reaction, namely, the formation of methane by the reaction:

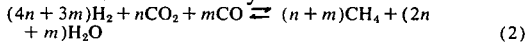

$(4n+3m)H_2+nCO_2+mCO \rightleftharpoons (n+m)CH_4+(2n+m)H_2O$ (2)

The use of a low nickel content reforming type catalyst for methanation achieves an important process function.

It has already been noted that high nickel content catalysts are used in methanation. However, high nickel content catalysts are sensitive to steam and high temperatures and rapidly degrade. Excessive steam in the gases being methanated results in rapid deterioration of such catalysts and impractically short periods of life during which the catalysts are effective. In the absence of steam, the large heat release accompanying the methanation of more than moderate amounts of the carbon oxides on such catalysts results in temperatures which place the system in a region where carbon laydown by reduction of carbon oxides by hydrogen is favored both kinetically and by equilibrium.

The low metal content wet methanation catalysts are not sensitive to steam or high temperatures. Therefore, they may be used to methanate relatively large concentrations of carbon oxides. Pressure, temperature and steam content, of course, must be adjusted so as to produce the desired product, namely methane. By proper adjustment of pressure, temperature and steam content, the reforming reaction is made to reverse itself producing substantial concentrations of the desired product methane. In addition the catalysts have been found to cause a water gas shift reaction at inlet sections of the wet methanation zone. As a consequence, no control need be exercised over the composition of the feed to the wet methanation reaction, such as controlling the ratio of hydrogen to carbon monoxide. This is a material deviation from prior art practices.

Independent of feed temperature which may range from about 900° to about 1100°F, methanation is carried out in a wet methanation unit such that exit temperatures exceed 900°F and are typically from about 1000° to 1600°F. High temperature methanation is not only desirable but a positive advantage. First of all high temperature methanation, i.e., where exit temperatures from a wet methanation exceed 900°F diminish the criticality of controlling carbon deposition. This is possible without catalyst degradation because of the use of the low metal content wet methanation catalysts. Prior art methanation catalysts having materially different supports quickly deteriorate at reaction temperatures above 900°F.

Secondly, because temperature is of little or no concern with respect to catalyst deterioration, methanation temperature can be maximized. This avoids the need for product recycle which is costly. More importantly it permits the production of high pressure steam in quantities sufficient for process needs without the resort to other power sources.

In all, all of the operating impediments inherent to all prior art processes for methane production are in substance discarded. The aim is maximized methane production per stage with only that control over temperature which is required for chemical equilibria.

Since methane recycle for temperature control is avoided, all of the exothermic heat generated in a wet methanation stage is made available for high pressure steam production.

For an individual wet methanation unit space velocities will generally vary from about 5,000 to about 20,000 SCFH per unit volume of low metal content, wet methanation catalyst.

As indicated, following water-gas shift wet methanation reactor 112, if used, the gas stream may pass to waste heat boiler 114, then to a first wet methanator 116 where it is brought into contact with the selected low metal content wet methanation catalyst. There, the methane content of the gas stream, independent of its initial content, is increased by methanation at the temperatures described above at pressures generally ranging up to about 1200 psia, typically from about 20 psia to about 1200 psia or more.

From there the gas stream is passed through waste heat boiler and associated steam drum 118, to generate high pressure steam (H.P. Steam) for use in the process and then by line 120 to one or more additional wet methanators 112 where, in contact with a low metal content wet methanation catalyst, the methane content may be finally increased up to about 90% by volume on carbon dioxide and water free basis again at the temperatures and pressures mentioned above. The gas stream is then finally passed to waste heat boiler and associated steam drum 124 to produce high pressure steam for use in the process.

Bypasses 160, 162, 164, 166 and 168 may be used to assist in controlling temperatures and gas stream compositions within the wet methanation operations.

Figure 5C:
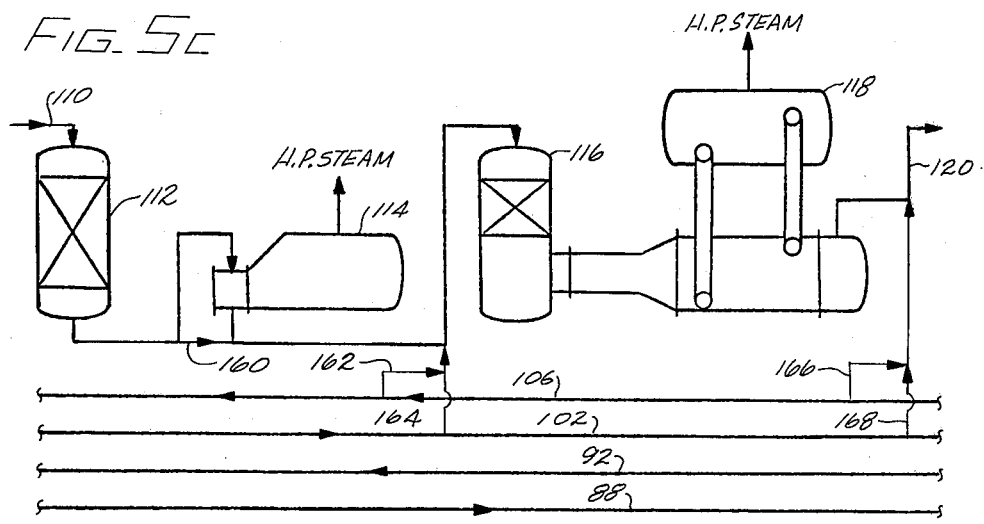
Figure 5F:
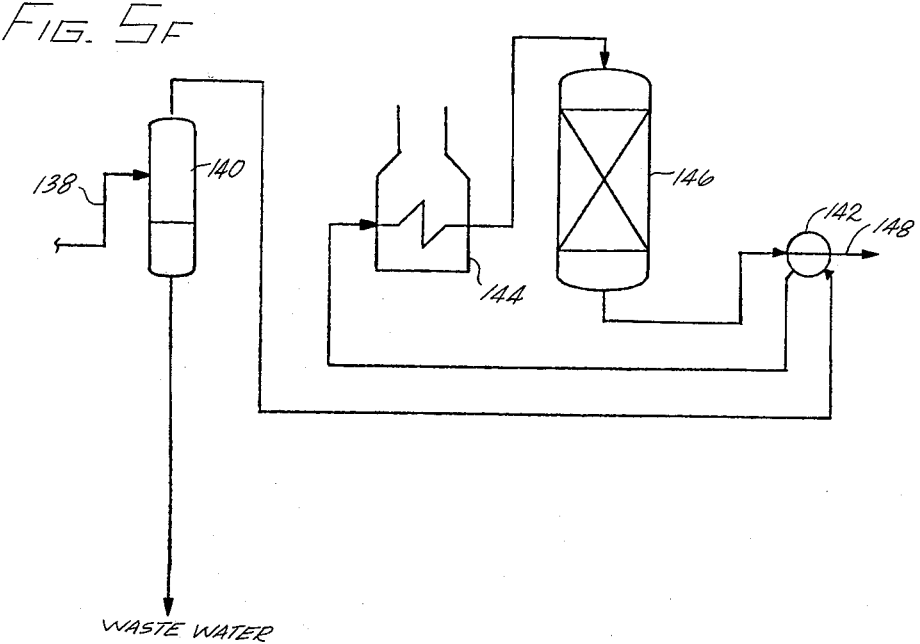
Figure 5G:
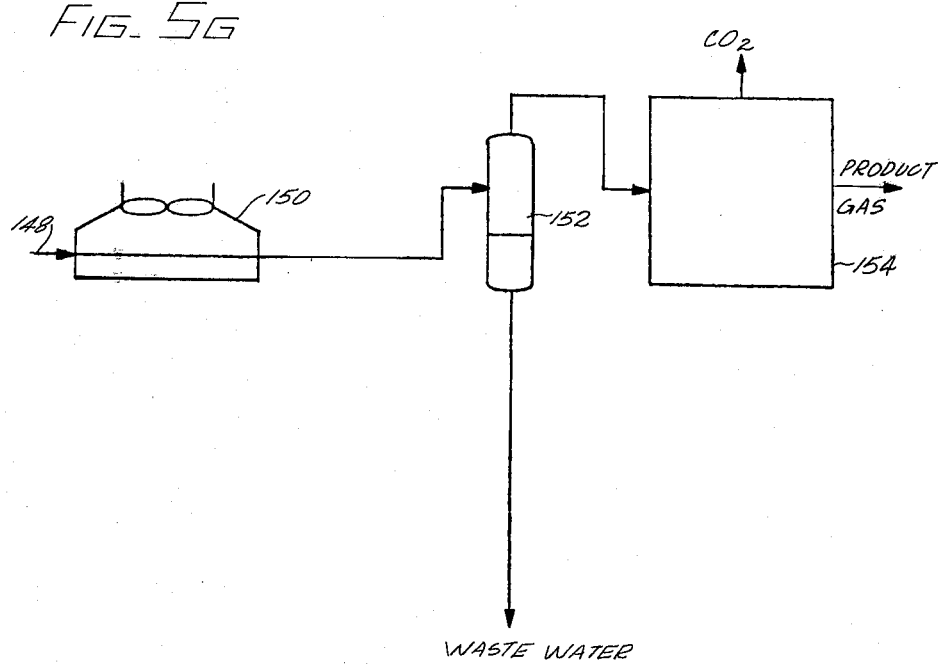

In the wet methanation operations shown in FIGS. 5C and 5D and as described in the preceding paragraphs, a series of adiabatic reactors and tubular heat exchangers are used to conduct the reactions and to recover heat for feed gas preheat and high pressure steam generation. The wet methanation catalyst can be installed either internal to or external to the tubes of a tubular reactor. On the opposite side of the heat transfer surface, cold feed gas or boiler feed water may be used to remove heat or reaction. Since the heat transfer coefficient exhibited by gases is considerably smaller than that exhibited by boiling water, the feed gas may be used to cool the reaction mass at the inlet to the catalyst to avoid cooling the reaction mass at an excessive rate and placing it in the carbon producing region. If necessary, two concentric tubes may be used with the feed gas in the annulus. With this arrangement, all reaction heat would be rejected to the feed gas which would in turn reject only that portion of the heat not necessary for preheat to the boiler feed water. Alternatively, all or any number of the functions exhibited by these individual items of equipment can be incorporated into a common piece of equipment or into a series of fluidized bed reactors.

Following wet methanation the gas stream is then passed by line 126 through high pressure boiler feed water preheater 128 to water separator 130 and then to low pressure steam waste heat boiler 132, where additional water is condensed from the gas stream and then to a second water separator 134, air cooler 136 and by line 138 to final water separator 140. A methanation stage operated at a reduced feed temperature may be employed prior to water removal following bulk or wet methanation.

Because of the several cooling and water condensation operations with intermediate water separation and when dry methanation is employed to maximize methane content of the gas stream, the gas stream is again heated to reaction temperature by passage through preheater 142 and start up heater 144. The stream is then passed to a final high pressure dry methanation reactor 146, where the methane content of the gas stream is increased to about 95% – 99.9% by volume on a dry basis after carbon dioxide removal. Again, conversion occurs in the presence of a conventional high metal content methanation catalyst preferably a high nickel content methanation catalyst. Because of the thermal instability of the high nickel content methanation catalyst temperature of the catalyst bed should not exceed 900°F, as this will result in catalyst deactivation.

The effluent from the final dry stage methanation reactor 146 is passed by line 148 to air cooler 150, then to separator 152 for final separation of any water present and passed through a carbon dioxide absorption stage 154 to remove the carbon dioxide left in the gas stream. The product leaving has a methane content of 95% – 99.9% by volume and contains less than 1 part per million sulfur. Where initial carbon dioxide removal is employed, the final carbon dioxide removal stage may be reduced or eliminated.

Water-gas shift reactor 112 or the functional equivalent of water-gas shift reactor 112 at the inlet end of wet methanation serves an important function in the system. If the gas stream entering the wet methanators contains only carbon dioxide, oxidation of the metal on the catalyst may occur deactivating the catalyst.

On the other hand, if carbon dioxide is absent, carbon deposition on the catalyst is most likely to occur, also deactivating the catalyst.

Therefore, water-gas shift maintains a balance between the carbon monoxide and carbon dioxide content of the gas stream to preclude the above phenomena. Generally, of the oxides of carbon present in the gas stream alone the ratio of carbon dioxide to carbon monoxide is normally between about 1:3 to about 3:1.

Water-gas shift may also, if desired, be accomplished by the use of a layer of a known water-gas shift catalyst above each bed of the wet methanation catalyst to maintain the carbon monoxide to carbon dioxide relationship such that the supported metal of the methanation catalyst will not oxidize or to preclude conditions favoring carbon deposition.

Carbon Elimination

In any operation relating to the conversion of carbon containing compounds in the presence of hydrogen and oxygen such as carburetion or the methanation reactions, carbon formation has always presented a problem.

This is particularly true where catalysts are employed since carbon formation and deposition onto a catalyst will promote further carbon deposition leading to termination of catalyst activity.

Chemical equilibrium for a carbon-hydrogen-oxygen system at first presented a dismaying degree of complexity. However, upon considering the reactions which can occur for such a system, a fundamental simplification of system was evolved which would predict the operating conditions where no carbon formation would occur.

This resulted from a recognition that at true equilibrium, the system could be described in terms of hydrogen, methane carbon monoxide, carbon dioxide, steam and carbon, regardless of the sources of the three elements. All other species when present being at concentrations which could be essentially ignored.

Since the number of elements could be reduced to three, namely carbon, hydrogen and oxygen, analysis of gasification raw materials, reaction masses, gasification products and mixtures thereof can be represented as unique points on a ternary diagram of the three elements for at least the reactions occurring within the process of this invention.

The establishment of these points, however, can only be determined by an iterative convergence method involving the solution of a set of simultaneous non-linear equations.

While no wise limiting, one set is set forth below.

To illustrate the results achieved by the solution of these equations there is provided FIGS. 6, 7, 8 and 9.

FIG. 6 represents carbon formation equilibrium isotherms at various operating temperatures shown in the ternary diagrams, for an operating pressure of 400 psia.

FIG. 7 represents carbon formation equilibrium isotherms but for an operating pressure of 1000 psia.

The axes represent the fractions of the atoms present in the total reaction mass which are hydrogen, oxygen and carbon. As to each, with reference to H—O axis, at or below each line or curve shown, carbon will not form for the pressure and temperature conditions shown. Above each line or curve, carbon formation can be predicted to occur.

The series of equations to be solved are as follows:

$$(CH_4) + (CO) + (CO_2) + (C) = (C^*) \quad (3)$$
$$2(H_2) + 4(CH_4) + 2(H_2O) = (H^*) \quad (4)$$
$$(CO) + 2(CO_2) + (H_2O) = (O^*) \quad (5)$$

$$K_1 = \frac{(H_2)^3 (CO)}{(CH_4)(H_2O)} \cdot \frac{(ATM)^2}{(TOT)^2} \quad (6)$$

$$\mathrm{Log}_{10} K_1 = A - K_1 + \frac{B - K_1}{°R} \quad (7)$$

$$K_2 = \frac{(H_2)(CO_2)}{(CO)(H_2O)} \quad (8)$$

$$\mathrm{Log}_{10} K_2 = A - K_2 + \frac{B - K_2}{°R} \quad (9)$$

$$K_3 = \frac{(CO_2)}{(CO)^2} \cdot \frac{(TOT)}{(ATM)} \quad (10)$$

$$\mathrm{Log}_{10} K_3 = A - K_3 + \frac{B - K_3}{°R} \quad (11)$$

$$(TOT) = (H_2) + (CH_4) + (CO) + (CO_2) + (H_2O) \quad (12)$$
$$(C) = 0 \quad (13)$$

wherein
  $(C^*)$ = total atoms carbon
  $(H^*)$ = total atoms hydrogen
  $(O^*)$ = total atoms oxygen
  $(H_2)$ = moles of hydrogen
  $(CH_4)$ = moles of methane
  $(CO)$ = moles of carbon monoxide
  $(CO_2)$ = moles of carbon dioxide
  $(H_2O)$ = moles of water
  $(TOT)$ = total moles of gas
  $(C)$ = atoms of solid carbon
  $K_1$ = reforming equilibrium constant for conversion of $CH_4$ to $H_2$ and $CO$
  $A - K_1$ = constant term of equation for reforming equilibrium constant for conversion of $CH_4$ to $H_2$ and $CO$
  $B - K_1$ = slope of equation for reforming equilibrium constant for conversion of $CH_4$ to $H_2$ and $CO$
  $K_2$ = water gas shift equilibrium constant for conversion of $CO$ to $H_2$
  $A - K_2$ = constant term of equation for water gas shift equilibrium constant for conversion of $CO$ to $H_2$
  $B - K_2$ = slope of equation for water gas shift equilibrium constant for conversion of $CO$ to $H_2$
  $K_3$ = equilibrium constant for carbon monoxide autoreduction to C
  $A - K_3$ = constant term of equation for equilibrium constant for carbon monoxide autoreduction to C
  $B - K_3$ = slope of equation for equilibrium constant for carbon monoxide autoreduction to C
  $°R$ = degrees Rankine
  $(ATM)$ = system pressure-atmospheres The mathematical system consists of 21 variables and 11 equations. Ten variables must be specified to make the system determinate. Six of the variables are the constants of the equations for equilibrium constants and fixed. Four more variables remain to be set. If the amounts of the three elements and the system pressure are set, then solution of the equations provides the temperature at which solid carbon will be deposited.

Alternatively, if the system temperature is specified, then a solution of the equations leads to the pressure at which solid carbon begins to deposit.

Finally, by specifying system pressure and temperature and two of the three elements, the equations yield the quantity of the third element at which carbon deposition is incipient.

The preceding equations include all significant species and reactions. The conditions to which they pertain are those of complete equilibrium, corresponding to the condition of a gas leaving a reaction zone. The gas stream entering a reaction zone is, however, removed from equilibrium. The only reactions during methanation which could possibly lead to the production of carbon are the decomposition of methane, the autoreduction of carbon monoxide and/or the reductions of carbon monoxide and/or carbon dioxide by hydrogen. Since thermodynamic potentials favor the formation of methane during methanation rather than its reaction, the production of carbon from methane need not be considered.

If the formation of carbon from methane is not removed from consideration, then application of the principles of chemical equilibrium invariably leads to the same set of equations set forth above which is primarily concerned with gas leaving a reaction zone. Removing the formation of carbon from methane leads to the following principles.

Dependent upon the composition of the gas entering a methanation reaction zone, each of the three remaining carbon forming reactions may exhibit different thermodynamic potentials for carbon formation, each being expressed as the temperature at which carbon begins to form by that particular reaction. In general, the thermodynamic potential for carbon formation for a gas entering a methanation reaction zone is equal to the greatest of the carbon formation temperatures for the three remaining carbon forming reactions. If the temperature of a gas within a methanation reaction zone is greater than the thermodynamic potential for carbon formation for the gas, then carbon will not form. If the temperature of a gas within a methanation reaction zone is less than the thermodynamic potential for carbon formation for the gas, then carbon will be expected to form. The thermodynamic potential for carbon formation of a gas within a methanation reaction zone is independent of its analysis by elements and determined solely by its molecular composition.

The foregoing provides preliminary information into the conditions governing carbon formation at the inlet or within a methanation reaction zone. It does not exhaust all possibilities.

As the composition of a gas is adjusted by the water-gas reaction, the three remaining carbon forming reactions will show increasing or decreasing thermodynamic potentials for carbon formation.

If the composition of a gas is properly adjusted by the water gas-shift reaction before entering a methanation reaction such that the water gas-shift equilibrium temperature for the adjusted composition is equal to the thermodynamic potential for carbon formation by any one of the three remaining carbon forming reactions for the adjusted gas composition, the various mathematical dependencies require that the other two remaining carbon forming reactions will show thermodynamic potentials for carbon formation identically equal to the one initially chosen. From these relationships the gas stream can be adjusted in composition to exhibit a minimum thermodynamic potential for carbon formation. Such a gas stream may be referred to as being in partial equilibrium. Its molecular composition and carbon formation thermodynamic potential temperature are a function of its analysis by elements and operating pressures.

Figure 8:
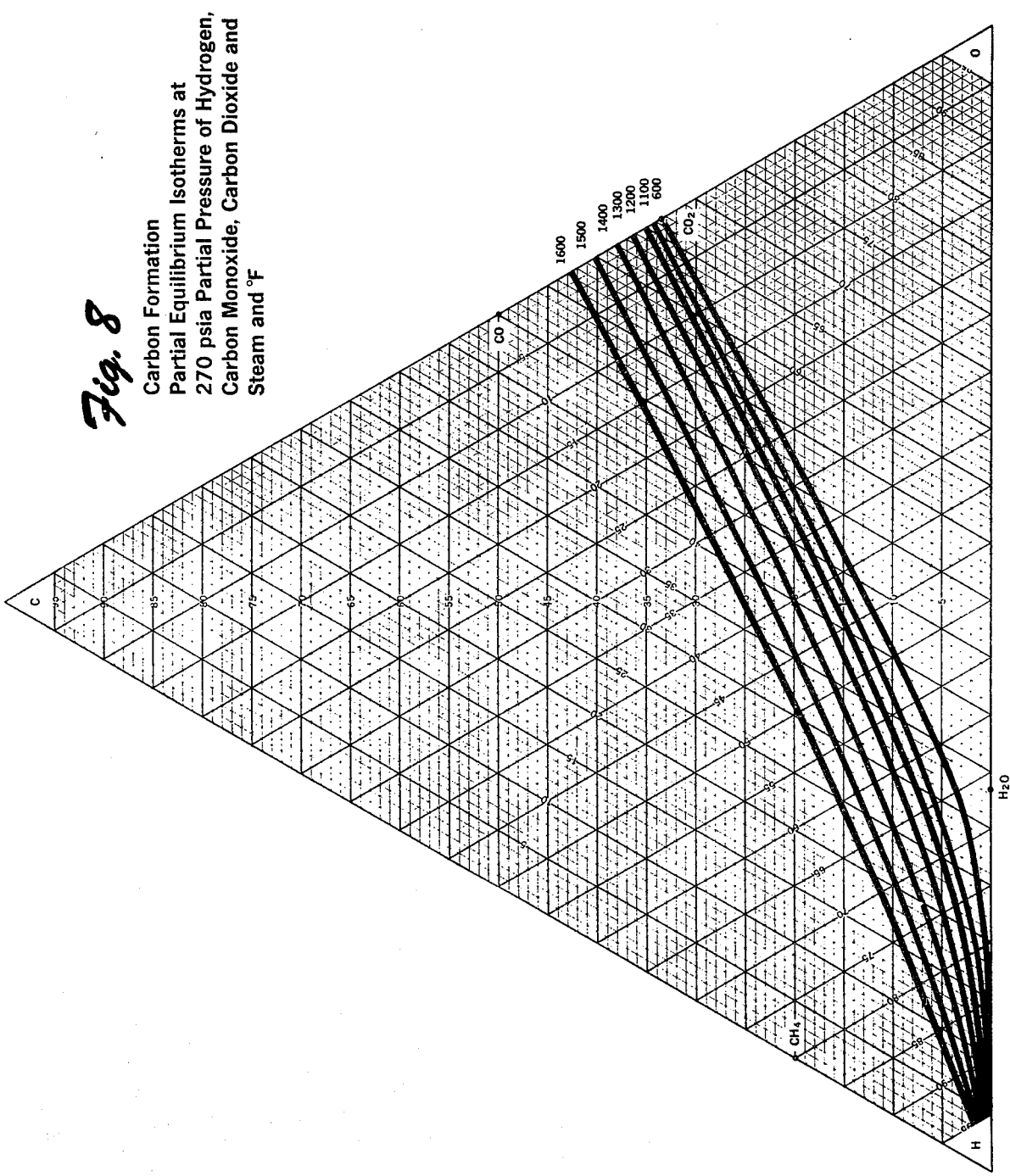
FIG. 8 is a ternary diagram illustrating partial equilibrium hydrogen, carbon monoxide, carbon dioxide and steam carbon formation isotherms at an operating partial pressure at 270 psia.

FIG. 8 represents carbon formation partial equilibrium isotherms at various operating temperatures shown in the ternary diagrams, for a partial pressure of hydrogen, carbon monoxide, carbon dioxide and steam of 270 psia.

Figure 9:
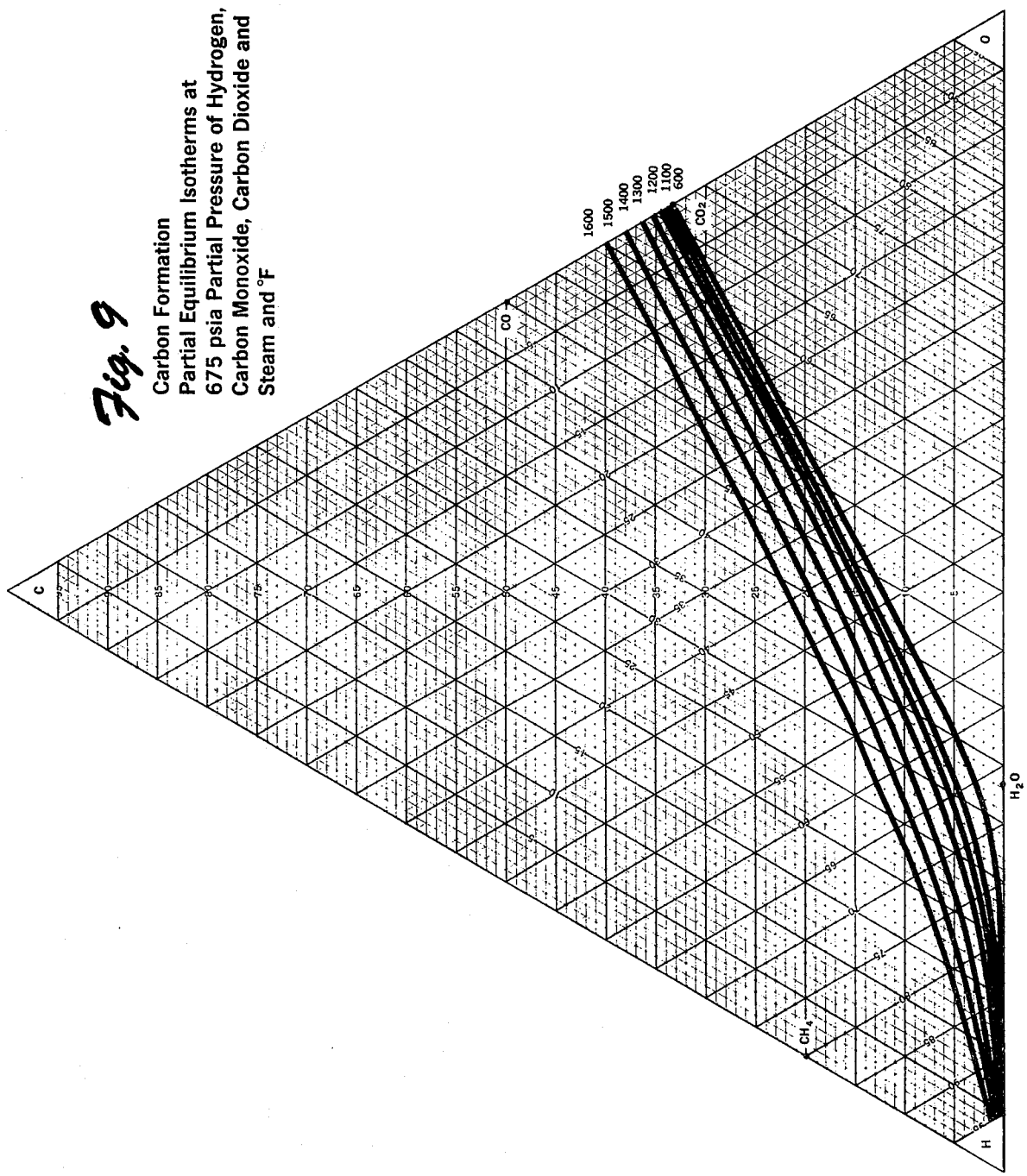
FIG. 9 is a ternary diagram illustrating partial equilibrium hydrogen, carbon monoxide, carbon dioxide and steam carbon formation isotherms at an operating partial pressure of 675 psia.

FIG. 9 represents carbon formation partial equilibrium isotherms at various operating temperatures shown in the ternary diagrams, but for a partial pressure of hydrogen, carbon monoxide, carbon dioxide and steam of 675 psia.

The axes represent the fractions of the atoms present in the reaction mass, other than those in methane, which are hydrogen, oxygen and carbon.

As to each, if the composition of the gas entering the methanation reaction zone is changed by a water-gas shift reaction to correspond to a water-gas shift equilibrium for the pressure and temperature conditions shown, then the resultant gas will show a minimum thermodynamic potential for carbon formation. If the resultant gas is entered into a methanation reaction zone operating at a temperature higher than shown, carbon will not form. If the resultant gas is entered into a methanation reaction zone operating at a temperature lower than that shown, then carbon formation can be expected to occur. If the composition of the gas is not adjusted to correspond to a water-gas shift equilibrium at the temperature and pressure shown, then the resultant gas will show a higher thermodynamic potential for carbon formation.

The series of equations to be solved consists of the original set of Equations with Equations 6 and 7 being removed from the system. The variables $CH_4$, $K_1$, $A - K_1$ and $B - K_1$ are likewise removed from the system. (ATM) is redefined as the sum of the partial pressures of hydrogen, carbon monoxide, carbon dioxide and steam.

The mathematical system is now reduced to 17 variables and nine equations leaving eight variables to be specified. Four of these are the constants of the equations for the equilibrium constants which leaves four more to be specified from among pressure, temperature and the composition variables as before.

The systems of mathematical equations presented are nonlinear which prevents their solution by any of the standard methods for solving sets of simultaneous linear equations. They are, however, of a form which permits an iterative technique to be used for their solution and makes use of a digital computer desirable.

However, the ready availability of digital computers in the chemical industry today makes their solution easy.

In the practice of the process of this invention, methanation is to be conducted, for a given pressure, at a temperature below the temperature at which carbon will occur at total equilibrium and above the temperature at which carbon will occur at partial equilibrium.

While in the practice of the process of this invention, dry methanation has been shown to precede, when employed, final carbon dioxide removal, it is equally expedient to have dry methanation follow final carbon dioxide removal.

Although it has been shown that the hydrogen requirements of the carburetor zone, when used, can be provided by the process gas stream there may be employed in the alternative an external source of hydrogen as provided, for instance, by steam reforming of a portion of the substitute natural gas produced or some intermediate gas stream.

In addition, the partial oxidation reactor may be supplanted by any number of equivalent units designed for the gasification of carbonaceous materials.

In the practice of this invention advantages are afforded to the art by the use of the low metal content wet methanation catalyst in which the support is a thermally stabilized, high purity ceramic alumina.

The unique feature is that the catalysts which have heretofore been used for methane reforming have been shown to be, at temperatures above 900°F, fully functional for the reverse reaction namely methane formation.

As a consequence it is no longer necessary to limit methanation to temperatures below 900°F, as with prior catalysts whose supports are thermally unstable above this temperature. The catalysts will not rapidly fuse or crumble leading to deactivation and/or shutdown due to high bed impedance to gas flow. The ability to operate at higher than usual methanation temperatures avoids the cost of methane recycle which is a characteristic of prior art processes.

The ability to operate at high temperatures avoids carbon deposition and at the same time permits the use of high temperatures to generate high pressure steam in which the process is self sufficient.

Because the low metal content wet methanation catalysts are also capable of causing the water-gas shift reaction to occur, a feed of virtually any composition to the wet methanators can be employed provided there are present constituents to provide the hydrogen and carbon monoxide required for methane formation. This avoids the need for a separate water-gas shift reactor and the need to remove carbon dioxide from the feed gas stream. Prior art processes, in contrast, require a separate water-gas shift with carbon dioxide removal to provide a molar ratio of hydrogen to carbon monoxide of 3 to 1 to enable methanation to proceed properly.

In summary, the process in addition to being self sufficient with respect to energy requirements and therefore operable at lower costs is extremely tolerant to a wide variety of conditions which would otherwise upset a conventional methanation operation.

EXAMPLES AND CONTROLS

Controls A, B and C and Example 1

Using oxygen generated by process steam there is formed an initial gas stream from oxygen, steam and a heavy hydrocarbon feed. The gas stream is fed through a carburetion zone where methane content is increased. The variant in the following text is the carbon dioxide-carbon monoxide ratio and the longevity of a commercially available low nickel content reforming catalyst used for methanation.

For the methanation reaction there is employed a tubular reactor having a L/D ratio of 8.7 surrounded by a modulated heat media capable of supplying heat for initiation of the methanation reaction and yet able to extract the exothermic heat of reaction. In each instance the gases enter the methanation reaction zone at a temperature of about 900°F and at a pressure of 300 psia. The methanation reaction is maintained at a controlled temperature of about 1100°F.

Control A

The first feed has the following composition in which the carbon monoxide to carbon dioxide ratio is 9:1.

| Component | Volume % |
|---|---|
| $H_2$ | 34.5 |
| $CH_4$ | 14.1 |
| CO | 19.7 |
| $CO_2$ | 2.1 |
| $H_2O$ | 29.6 |

At the onset methanation is successful. However catalyst activity is lost within 24 hours. Examination of the catalyst reveals significant quantities of deposited elemental carbon.

Control B

The composition of the feed gas stream is changed as follows:

| Component | Volume % |
|---|---|
| $H_2$ | 34.5 |
| $CH_4$ | 14.1 |
| CO | 0 |
| $CO_2$ | 21.8 |
| $H_2O$ | 29.6 |

After operation for 21 days the catalyst loses its activity for forming methane. Rather than finding loss of activity due to carbon deposition which is present in only trace amounts, it is concluded that in the absence of carbon monoxide, the nickel is oxidized.

Control C

Using the same catalyst the composition of the feed gas stream to the methanation reactor is changed as follows:

| Component | Volume % |
|---|---|
| $H_2$ | 38.4 |
| $CH_4$ | 10.3 |
| CO | 0 |
| $CO_2$ | 15.4 |
| $H_2O$ | 35.9 |

The catalyst is capable of methanation at an outlet temperature of about 1150° to 1175°F from the onset. A decrease in activity is noted after 6 days.

Example 1

At a showing of decreased catalyst activity the gas composition is changed by water gas shift reaction as follows:

| Component | Volume % |
|---|---|
| $H_2$ | 30.9 |
| $CH_4$ | 9.6 |
| CO | 7.9 |
| $CO_2$ | 7.9 |
| $H_2O$ | 43.7 |

This changed the carbon dioxide to carbon monoxide ratio to 1:1. The catalyst resumes its methanation activity and shows no sign of decreased activity after 75 days of operation.

Example 2

The following illustrates bulk or wet methanation using a catalyst consisting of 16% by weight nickel (deposited by a metal salt solution immersion and subsequent heating) on a high purity alumina support known as SAHT-99 manufactured and sold by The Carborunbum Company. The support has a typical composition of 99.5% by weight $Al_2O_3$, 0.02% by weight $SiO_2$, 0.04% by weight $Fe_2O_3$ and 0.45% by weight $Na_2O$. Surface area is in the range of 0.5–5.5 $m^2/g$. Table 1 below shows the inlet and outlet conditions for wet methanators in series. High pressure steam is generated between each reactor and following the last. In the example provided below all of the steam and feed are supplied to the first reactor. Equally convenient is to feed all of the steam required for carbon control to the first reactor while dividing the feed gas stream between the several reactors of the series.

As is evident from Table 1, because water content decreased in the first reactor of the series, water-gas shifting occurred.

Table 1

|  | 1st Reactor | | 2nd Reactor | | 3rd Reactor | | 4th Reactor | |
| --- | --- | --- | --- | --- | --- | --- | --- | --- |
|  | Inlet | Outlet | Inlet | Outlet | Inlet | Outlet | Inlet | Outlet |
|  | Component(M/Hr) | | | | | | | |
| $H_2$ | 45.00 | 39.22 | 39.22 | 24.67 | 24.67 | 14.45 | 14.45 | 8.30 |
| $CH_4$ | 1.00 | 8.50 | 8.50 | 14.81 | 14.81 | 18.89 | 18.89 | 21.07 |
| CO | 45.00 | 20.77 | 20.77 | 10.08 | 10.08 | 3.99 | 3.99 | 1.44 |
| $CO_2$ | 9.00 | 25.73 | 25.73 | 30.11 | 30.11 | 32.12 | 32.12 | 32.50 |
| $H_2O$ | 65.00 | 55.77 | 55.77 | 57.71 | 57.71 | 59.77 | 59.77 | 61.57 |
| Sum | 165.00 | 149.99 | 149.99 | 137.38 | 137.38 | 129.22 | 129.22 | 124.88 |
| PSIA | 1010 | 1000 | 990 | 980 | 970 | 960 | 950 | 940 |
| T, °F | 900 | 1565 | 900 | 1371 | 900 | 1201 | 900 | 1056 |

The effluent from the fourth reactor following water removal is passed through a dry methanation stage. Table 2 shows the composition of the effluent gas stream under conditions where carbon dioxide is or is not removed with water prior to dry methanation.

Table 2

|  | No $CO_2$ Removal | | $CO_2$ Removal | |
| --- | --- | --- | --- | --- |
|  | Inlet | Outlet | Inlet | Outlet |
|  | Component(M/Hr) | | | |
| $H_2$ | 8.30 | 0.69 | 8.30 | 3.99 |
| $CH_4$ | 21.07 | 23.06 | 21.07 | 22.50 |
| CO | 1.44 | 1.06 | 1.44 | $5 \times 10^{-4}$ |
| $CO_2$ | 32.50 | 30.88 | 0.00 | $9 \times 10^{-4}$ |
| $H_2O$ | 0.00 | 3.62 | 0.00 | 1.43 |
| Sum | 63.31 | 59.31 | 30.81 | 27.92 |
| PSIA | 890 | 880 | 890 | 880 |
| T, °F | 678 | 900 | 505 | 900 |

We claim:

1. A process for the production of substitute natural gas which comprises:
   a. providing from the process a supply of high pressure steam;
   b. using a portion of the high pressure steam to liquefy air and generate, from the liquefied air, gaseous oxygen;
   c. introducing the gaseous oxygen, steam and a carbonaceous material to a partial oxidation reaction zone to form an initial gas stream containing predominately hydrogen and the oxides of carbon and minor amounts of methane;
   d. passing at least a portion of the initial gas stream and steam through at least one wet methanation reaction zone where the gas stream and steam contact a low metal content wet methanation catalyst which comprises from about 5 to about 35% by weight of at least one metal from the third period of Group VIII of the Periodic Table on a temperature stabilized, ceramic alumina support, said support being heat treated at a temperature above the highest temperature encountered in said methanation zone prior to the addition of said metal thereto, at a temperature from about 900° to about 1600°F where the feed temperature to said wet methanation zone is at least about 900°F and the exit temperature from said methanation zone is up to about 1600°F to form methane followed by cooling of the gas stream exiting the wet methanation zone to produce high pressure process steam.

2. A process as claimed in claim 1 in which the initial gas stream is passed through a plurality of wet methanation reaction zones in series with cooling of the gas stream between each wet methanation zone to produce high pressure process steam.

3. A process as claimed in claim 1 in which water is separated from the gas stream exiting the wet methanation zone and the gas stream is passed through at least one dry methanation reaction zone containing a high metal content methanation catalyst to increase the methane content of the gas stream.

4. A process as claimed in claim 2 in which water is separated from the gas stream exiting the wet methanation zones and gas stream is passed through at least one dry methanation reaction zone containing a high metal content methanation catalyst to increase the methane content of the gas stream.

5. A process as claimed in claim 1 in which the initial gas stream from the partial oxidation zone is combined with steam and a hydrocarbon in a carburetion zone maintained at substantially the same pressure as the partial oxidation zone to increase the methane content of the gas stream to about 15% to about 50% by volume methane prior to contact with the wet methanation zone.

6. A process as claimed in claim 2 in which the initial gas stream from the partial oxidation zone is combined with steam and a hydrocarbon in a carburetion zone maintained at substantially the same pressure as the partial oxidation zone to increase the methane content of the gas stream to about 15% to about 50% by volume methane prior to contact with the wet methanation zone.

7. A process as claimed in claim 3 in which the initial gas stream from the partial oxidation zone is combined with steam and a hydrocarbon in a carburetion zone maintained at substantially the same pressure as the partial oxidation zone to increase the methane content of the gas stream to about 15% to about 50% by volume methane prior to contact with the wet methanation zone.

8. A process as claimed in claim 2 in which reaction in the partial oxidation reaction is carried out at a temperature of from about 1800°F to about 2700°F and at a pressure up to about 1200 psia and wet methanation is carried out at a pressure up to about 1200 psia.

9. A process as claimed in claim 3 which reaction in the partial oxidation reaction is carried out at a temperature of from about 1800°F to about 2700°F and at a pressure up to about 1200 psia and wet methanation is carried out at a pressure up to about 1200 psia.

10. A process as claimed in claim 4 in which reaction in the partial oxidation reaction is carried out at a temperature of from about 1800°F to about 2700°F and at a pressure up to about 1200 psia and wet methanation is carried out at a pressure up to about 1200 psia.

11. A process as claimed in claim 5 in which the partial oxidation reaction is carried out at a temperature from about 1800°F to about 2700°F, carburetion at a temperature above about 1500°F, the partial oxidation and carburetion reactions are carried out at pressures up to about 1200 psia and wherein wet methanation is carried out at a pressure up to about 1200 psia.

12. A process for the production of substitute natural gas which comprises:
   a. providing from the process a supply of high pressure steam;
   b. using a portion of the high pressure steam to liquefy air and generate, from the liquefied air, gaseous oxygen;
   c. introducing the gaseous oxygen, steam and a carbonaceous material to a partial oxidation reaction zone to form an initial gas stream containing predominately hydrogen and the oxides of carbon and minor amounts of methane and carbon;
   d. passing a portion of the initial gas stream and steam through a first wet methanation reaction zone where the gas stream and steam undergo a water-gas shift reaction and methanation in contact with a low metal content wet methanation catalyst which comprises from about 5 to about 35% by weight of at least one metal from the third period of Group VIII of the Periodic Table on a temperature stabilized, ceramic alumina support, said support being heat treated at a temperature above the highest temperature encountered in said wet methanation zone prior to the addition of said metal thereto, at a temperature from about 900° to about 1600°F where the feed temperature to said wet methanation zone is at least about 900°F and the exit temperature from said methanation zone is up to about 1600°F to form methane followed by cooling of the gas stream exiting the wet methanation zone to produce high pressure process steam;
   e. passing the balance of the initial gas stream and the cooled effluent from the first wet methanation reaction zone through a plurality of wet methanation zones, each wet methanation reaction zone containing a low metal content wet methanation catalyst which comprises from about 5 to about 35% by weight of at least one metal from the third period of Group VIII of the Periodic Table on a temperature stabilized, ceramic alumina support, said support being heat treated at a temperature above the highest temperature encountered in said wet methanation zone prior to the addition of said metal thereto, at a temperature from about 900° to about 1600°F where the feed temperature to each wet methanation zone is at least about 900°F and the exit temperature from each wet methanation zone is up to about 1600°F to form additional methane followed by cooling of the gas stream exiting each wet methanation zone to produce high pressure process steam.

13. In a process for the production of methane from a feed stream comprising hydrogen, the oxides of carbon and water, as steam, is contacted with a supported catalyst containing at least one metal from the third period of Group VIII of the Periodic Table in a wet methanation zone the improvement which comprises contacting the feed stream in the wet methanation zone with a supported catalyst which contains from about 5 to about 35% by weight of at least one metal of the third period of Group VIII of the Periodic Table on a temperature stabilized, ceramic alumina support, said support being heat treated at a temperature above the highest temperature encountered in said wet methanation zone prior to the addition of said metal thereto, said supported catalyst being capable of causing a water-gas shift reaction and methanation at a temperature from about 900°F to about 1600°F, to form methane at a temperature in which the feed temperature to the wet methanation zone is at least about 900°F and the exit temperature is up to about 1600°F, said wet methanation zone being operated to form methane under adiabatic conditions and then removing the heat of reaction following the wet methanation zone.

* * * * *

UNITED STATES PATENT AND TRADEMARK OFFICE
CERTIFICATE OF CORRECTION

PATENT NO. : 3,938,968
DATED : February 17, 1976
INVENTOR(S) : Gerald A. White & Theodore R. Roszkowski It is certified that error appears in the above-identified patent and that said Letters Patent are hereby corrected as shown below:

Column 2, line 21, "chamical" should read --chemical--.

Column 3, line 65, after "Table," insert --as published in "Chemical Engineers Handbook", Third Edition, Perry, McGraw-Hill Book Company, Inc., 1950--.

Column 8, line 3, after "Mendeleef", insert --, as published in "Chemical Engineers Handbook", Third Edition, Perry, McGraw-Hill Book Company, Inc., 1950--.

Column 12, line 13,

"$(n + m)CH_4 + (2n + m)H_2) \rightleftharpoons (4n + 3m)H_2 + nCO_2 + mCO$"  (1)

should read

--$(n + m)CH_4 + (2n + m)H_2O \rightleftharpoons (4n + 3m)H_2 + nCO_2 + mCO$--  (1)

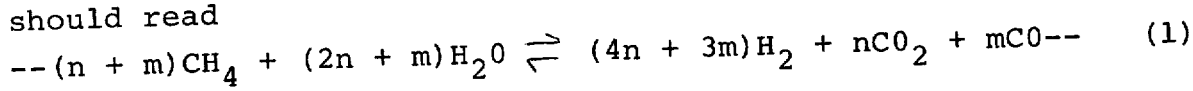

Column 13, line 52, "or" should read --of--.

Column 22, line 54, after "claim 3" insert --in--.

Signed and Sealed this

Fifth Day of October 1976

[SEAL]

Attest:

RUTH C. MASON
Attesting Officer

C. MARSHALL DANN
Commissioner of Patents and Trademarks